US 8,481,871 B2

(12) United States Patent
Turner

(10) Patent No.: US 8,481,871 B2
(45) Date of Patent: *Jul. 9, 2013

(54) DYNAMIC THICKNESS ADAPTATION FOR AN IN-LINE SCALE

(75) Inventor: Bryan J. Turner, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 486 days.

This patent is subject to a terminal disclaimer.

(21) Appl. No.: 12/848,881

(22) Filed: Aug. 2, 2010

(65) Prior Publication Data

US 2010/0294572 A1    Nov. 25, 2010

Related U.S. Application Data

(63) Continuation-in-part of application No. 12/817,087, filed on Jun. 16, 2010, which is a continuation-in-part of application No. 12/562,798, filed on Sep. 18, 2009, now Pat. No. 8,129,635, which is a continuation-in-part of application No. 11/855,130, filed on Sep. 13, 2007, now Pat. No. 7,687,727.

(51) Int. Cl.
*G01G 19/00* (2006.01)
*G01G 19/414* (2006.01)

(52) U.S. Cl.
USPC .................. 177/25.15; 702/101; 705/415

(58) Field of Classification Search
USPC ............... 177/25.15, 184–189; 271/272–274; 702/101–102, 173–175; 705/415
See application file for complete search history.

(56) References Cited

U.S. PATENT DOCUMENTS

| 2,538,369 A | 1/1951 | Leary |
| 3,386,574 A | 6/1968 | Kaplan |
| 3,431,830 A | 3/1969 | Stovall |
| 3,648,839 A | 3/1972 | Bradshaw |
| 3,796,424 A | 3/1974 | Fox |
| 3,805,904 A | 4/1974 | Zimmerer |

(Continued)

FOREIGN PATENT DOCUMENTS

| EP | 2 172 751 A1 | 9/2009 |
| WO | WO2007031176 A1 | 3/2007 |
| WO | WO2009036251 A1 | 3/2009 |

OTHER PUBLICATIONS

Stolowitz Ford Cowger LLP List of Related Matters dated Dec. 23, 2011.

(Continued)

*Primary Examiner* — Randy W Gibson
(74) *Attorney, Agent, or Firm* — Stolowitz Ford Cowger LLP

(57) ABSTRACT

Methods and apparatus for weighing an article, such as a mail piece, while the article is moving at high speed. An article (900) is received from an intake transport (1200), and gripped in a weighing station (1310), in between a capstan roller and a pinch roller (1316), which are synchronized to minimize slipping. A first precision servo system (1252, 1250) alters the speed of the article, and in the process acquires torque data for storage and analysis (1212, 1282). A second precision servo system (1260,1330) applies a constant force, via a tension arm (1320), urging the pinch roller (1316) against the capstan roller, independently of the thickness of the mail piece. Active electronic damping (1900) reduces oscillation when an inconsistency in thickness of the article is encountered during weighing. The damping force is subtracted from the capstan motor torque data for improved accuracy (FIG. 20B).

12 Claims, 20 Drawing Sheets

U.S. PATENT DOCUMENTS

| | | | |
|---|---|---|---|
| 3,834,474 A | | 9/1974 | Knol |
| 3,957,570 A | | 5/1976 | Helm |
| 4,170,350 A | * | 10/1979 | Conti .................. 271/274 |
| 4,262,763 A | | 4/1981 | Raskin |
| 4,461,363 A | | 7/1984 | Loy |
| 4,534,551 A | | 8/1985 | Jones |
| 4,696,358 A | | 9/1987 | Doerman |
| 4,848,492 A | * | 7/1989 | Hubbard et al. ........ 177/210 FP |
| 4,916,391 A | | 4/1990 | Doerman |
| 5,019,991 A | | 5/1991 | Sansone |
| 5,172,900 A | * | 12/1992 | Uno et al. ............. 271/125 |
| 5,259,607 A | | 11/1993 | Hironari |
| 5,303,913 A | | 4/1994 | Trouquilla |
| 5,308,932 A | | 5/1994 | Manduley |
| 5,393,939 A | | 2/1995 | Nasuta, Jr. |
| 5,465,662 A | | 11/1995 | Keung |
| 5,480,085 A | | 1/1996 | Smithe |
| 5,499,810 A | | 3/1996 | Tranquilla |
| 5,524,878 A | | 6/1996 | Trouquilla |
| 5,547,034 A | | 8/1996 | Wurz |
| 5,767,452 A | * | 6/1998 | Yankloski .............. 177/25.11 |
| 5,850,057 A | | 12/1998 | Veillette |
| 5,856,637 A | | 1/1999 | Vande Berg |
| 5,869,092 A | | 2/1999 | Hays |
| 5,879,000 A | | 3/1999 | Kakuta |
| 5,902,964 A | | 5/1999 | Solberg, Jr. |
| 5,939,646 A | | 8/1999 | Fowler |
| 5,998,742 A | | 12/1999 | Liu |
| 6,141,883 A | * | 11/2000 | Mitchell et al. ........... 33/501.02 |
| 6,276,421 B1 | | 8/2001 | Valenti |
| 6,464,219 B1 | | 10/2002 | Yee |
| 6,497,522 B2 | | 12/2002 | Wotton |
| 6,820,873 B2 | | 11/2004 | Kulpa |
| 6,839,694 B2 | * | 1/2005 | Kasmin et al. ............. 705/407 |
| 6,940,025 B1 | | 9/2005 | Salomon |
| 7,014,187 B2 | | 3/2006 | Mayerberg, II |
| 7,096,152 B1 | | 8/2006 | Ong |
| 7,182,334 B2 | | 2/2007 | Spence |
| 7,241,955 B2 | | 7/2007 | Hebenstreit |
| 7,271,352 B2 | | 9/2007 | Rabindran |
| 7,297,879 B2 | | 11/2007 | Salomon |
| 7,550,681 B2 | | 6/2009 | Wang |
| 7,687,727 B2 | | 3/2010 | Turner |
| 7,820,923 B1 | | 10/2010 | Daboub |
| 8,106,315 B2 | | 1/2012 | Turner |
| 8,148,650 B2 | | 4/2012 | Sye |
| 8,178,796 B2 | * | 5/2012 | Allen et al. ............. 177/25.15 |
| 2005/0267848 A1 | | 12/2005 | Kenbeek |
| 2007/0045944 A1 | * | 3/2007 | Ban et al. ................ 271/272 |
| 2008/0042340 A1 | * | 2/2008 | Linder et al. .............. 271/274 |
| 2009/0071728 A1 | | 3/2009 | Turner |
| 2009/0216487 A1 | | 8/2009 | Streder |
| 2010/0006346 A1 | | 1/2010 | Turner |
| 2010/0082389 A1 | | 4/2010 | Turner |
| 2010/0282521 A1 | | 11/2010 | Turner |
| 2011/0049800 A1 | * | 3/2011 | deJong et al. ............. 271/273 |

OTHER PUBLICATIONS

International Searching Authority USPTO; International Search Report and Written Opinion; Jan. 7, 2009; 14 pages for PCT/US2008/076140.

European Patent Office, European Search Report for Application No. 09252332.3-2213, mail date Dec. 3, 2009.

International Bureau, International Preliminary Report on Patentability, Chapter I of the PCT, for Application No. PCT/US2008/076140, International Filing Date Sep. 12, 2008, Mail Date Mar. 25, 2010.

* cited by examiner

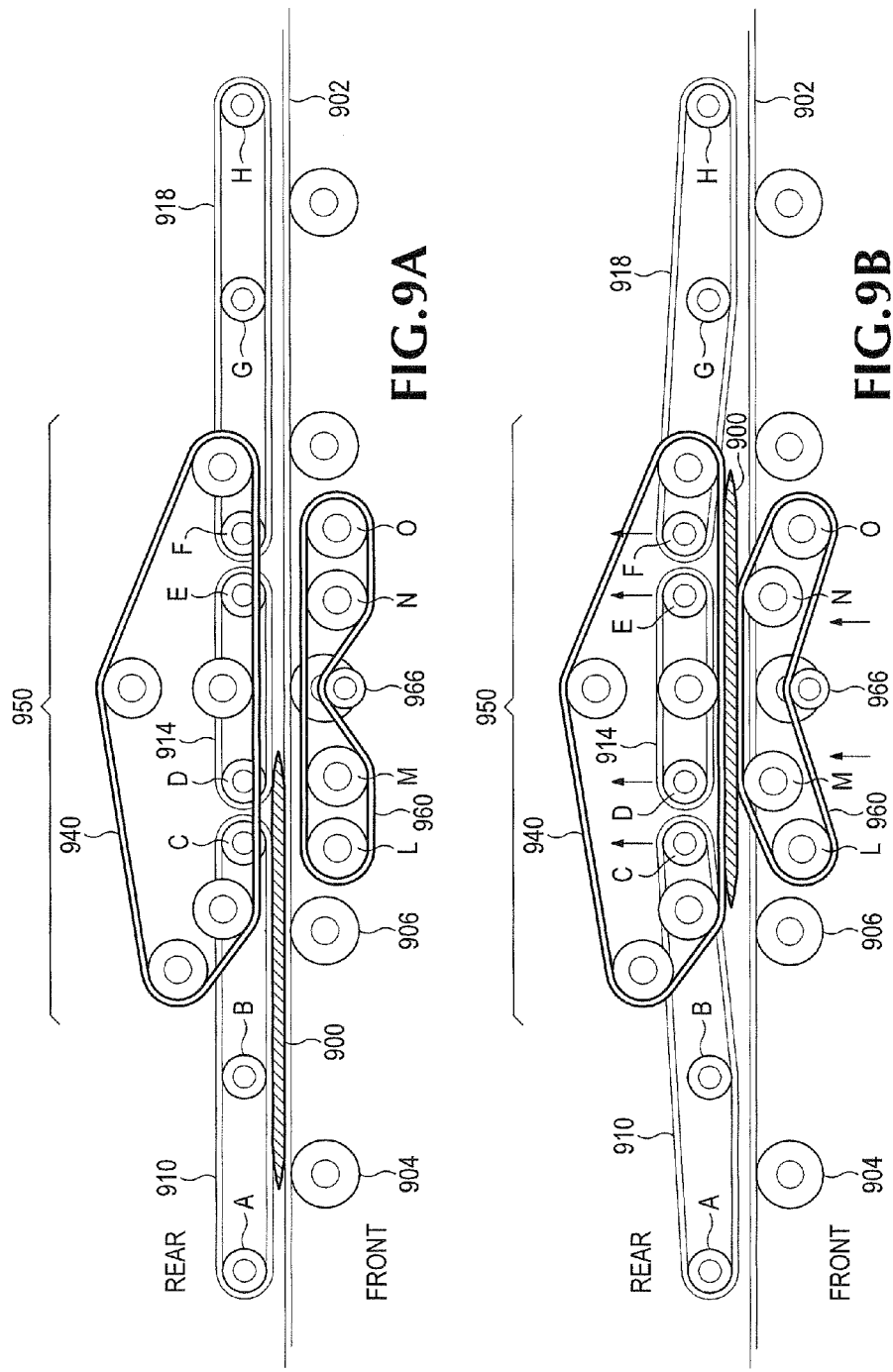

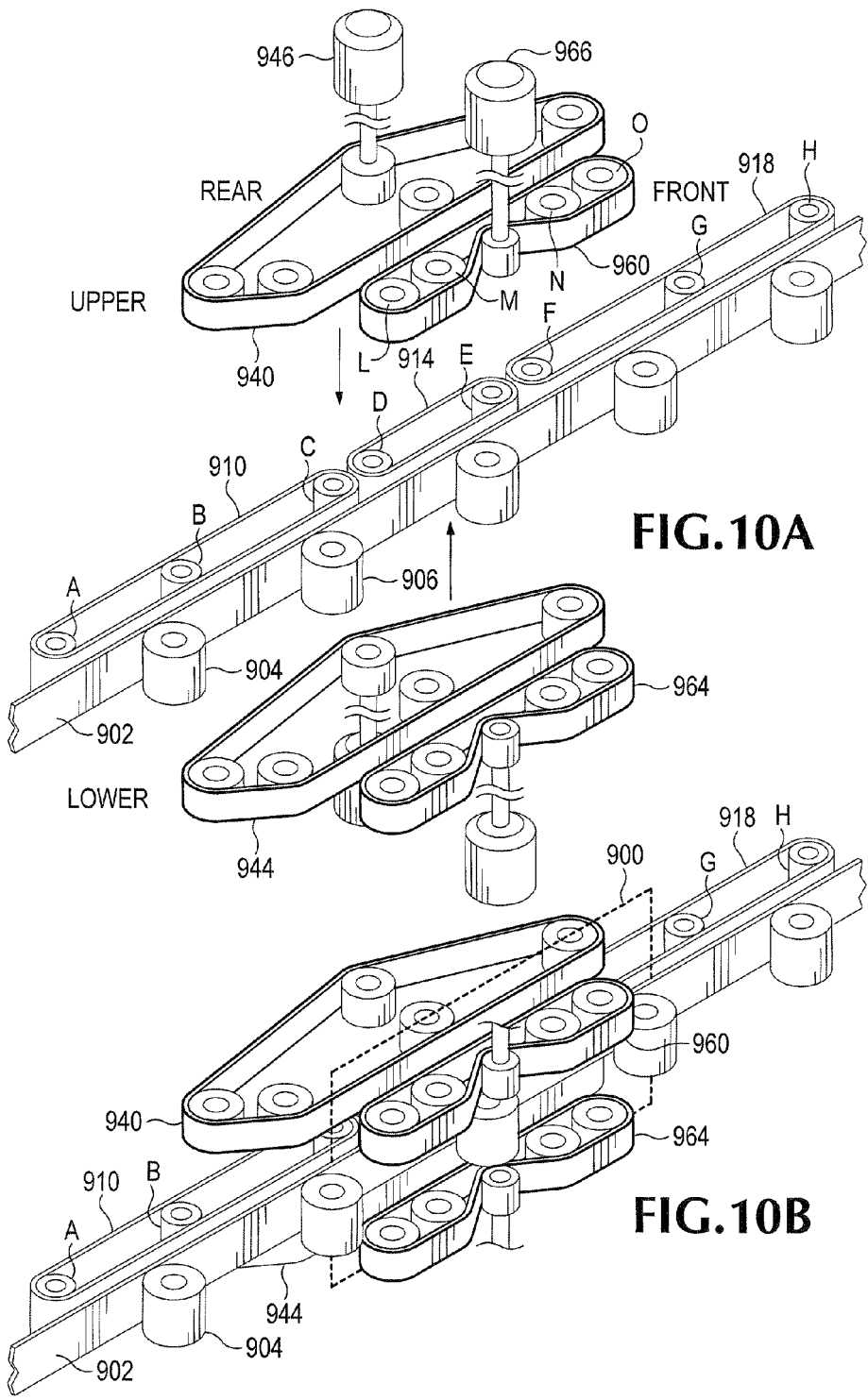

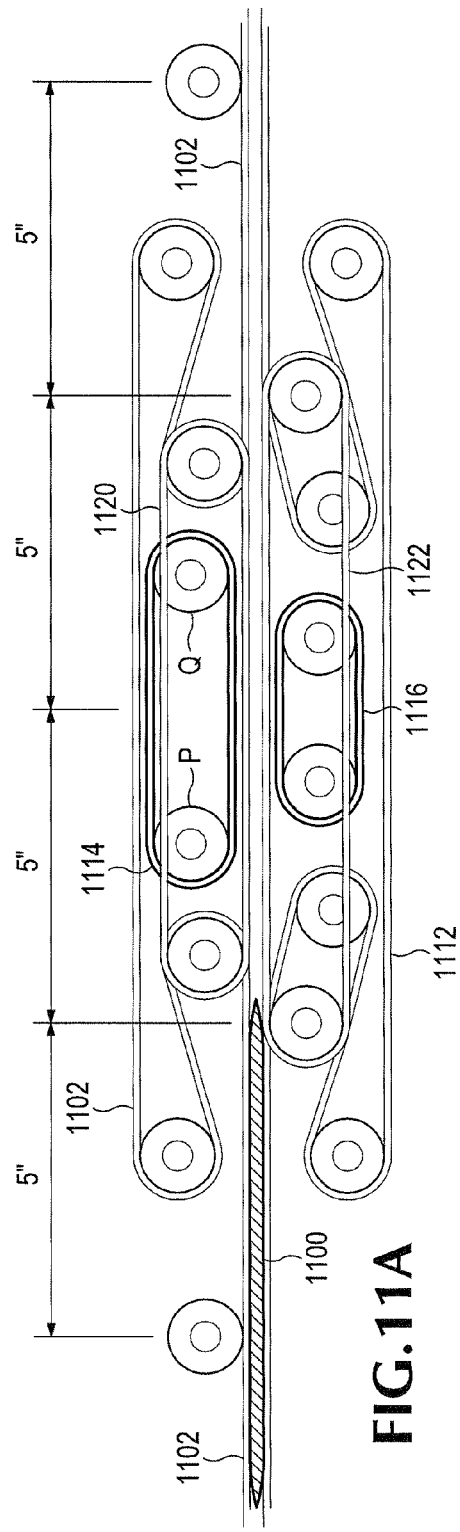
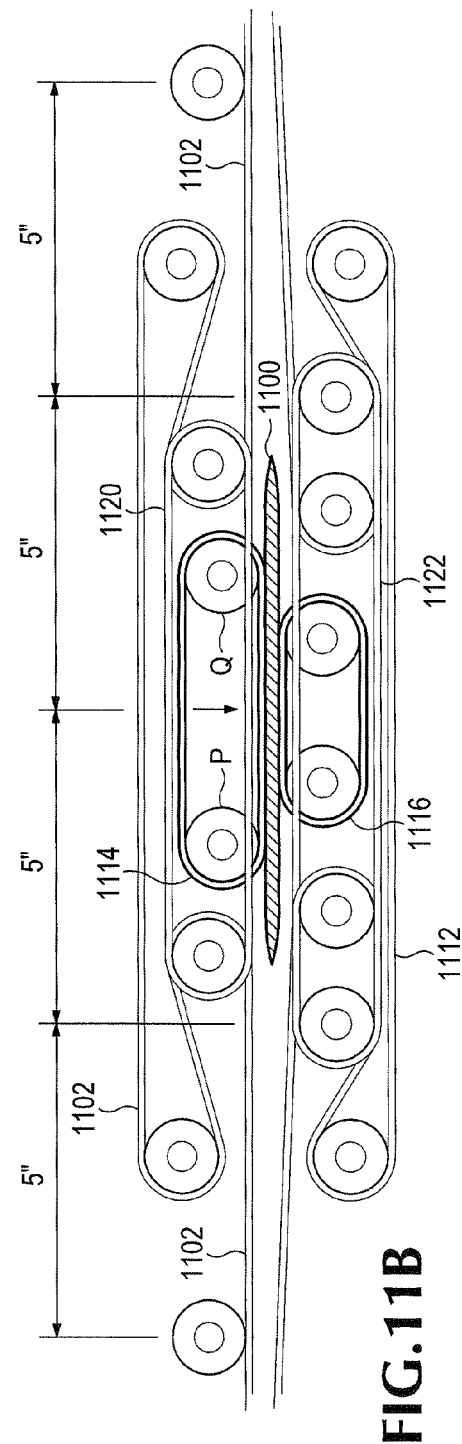
FIG.11A
FIG.11B

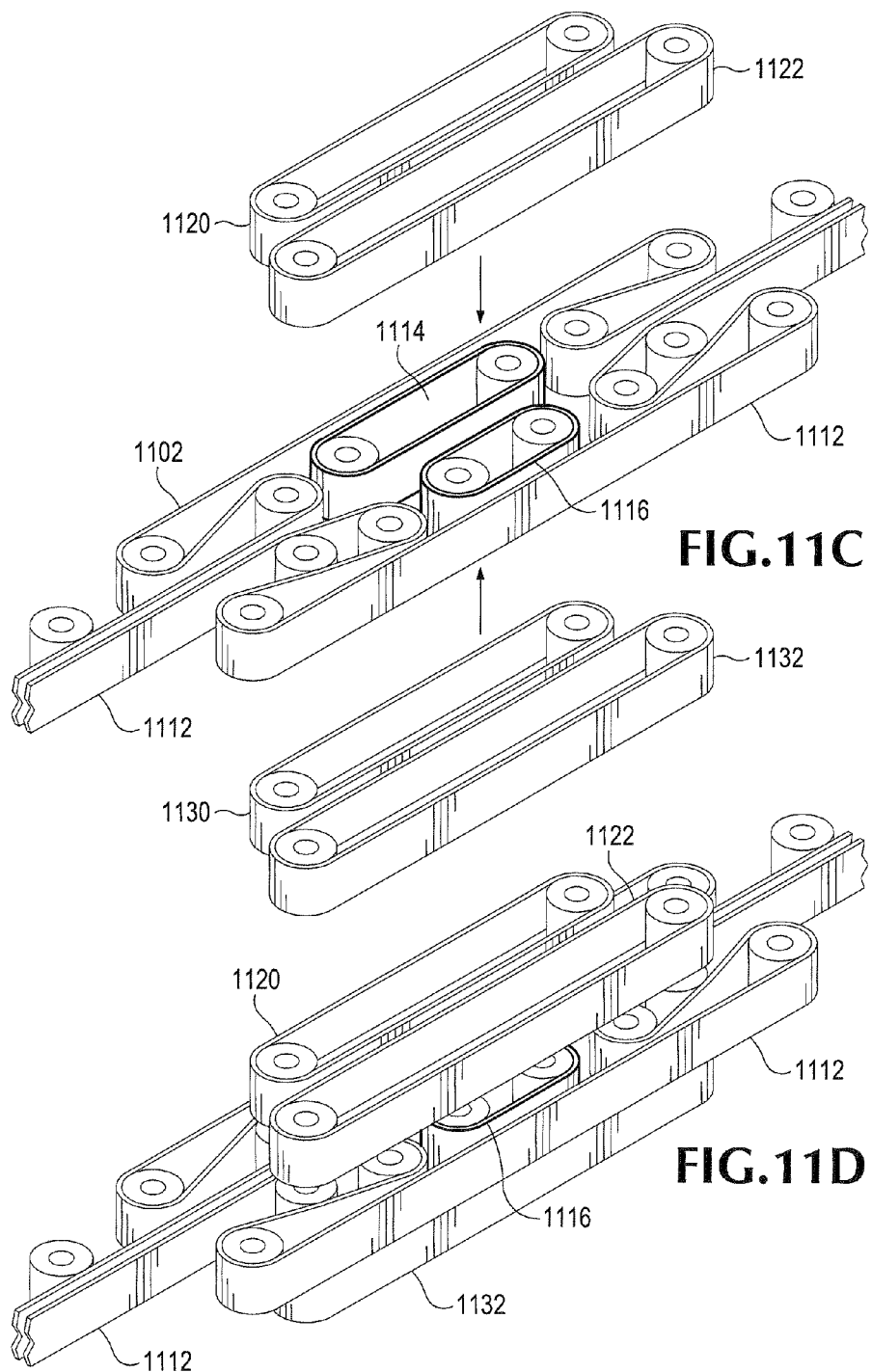

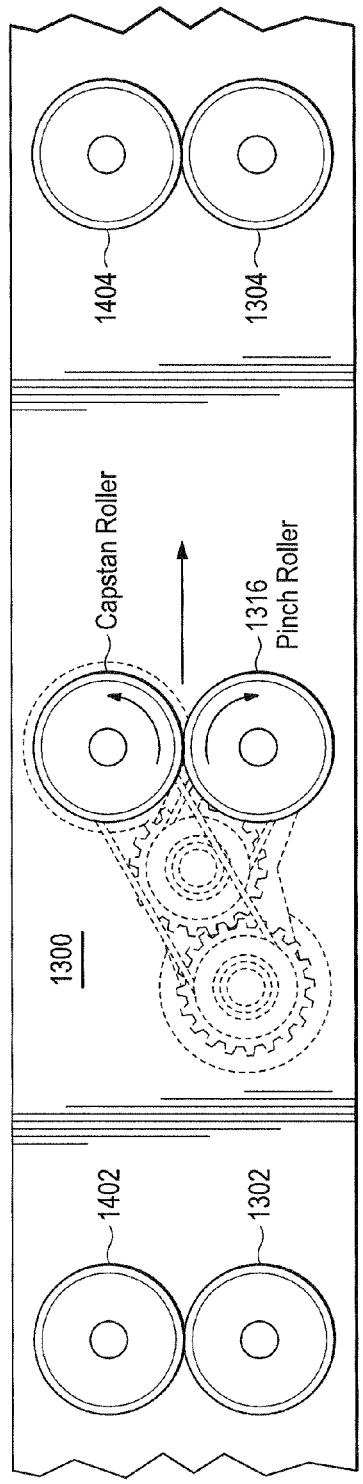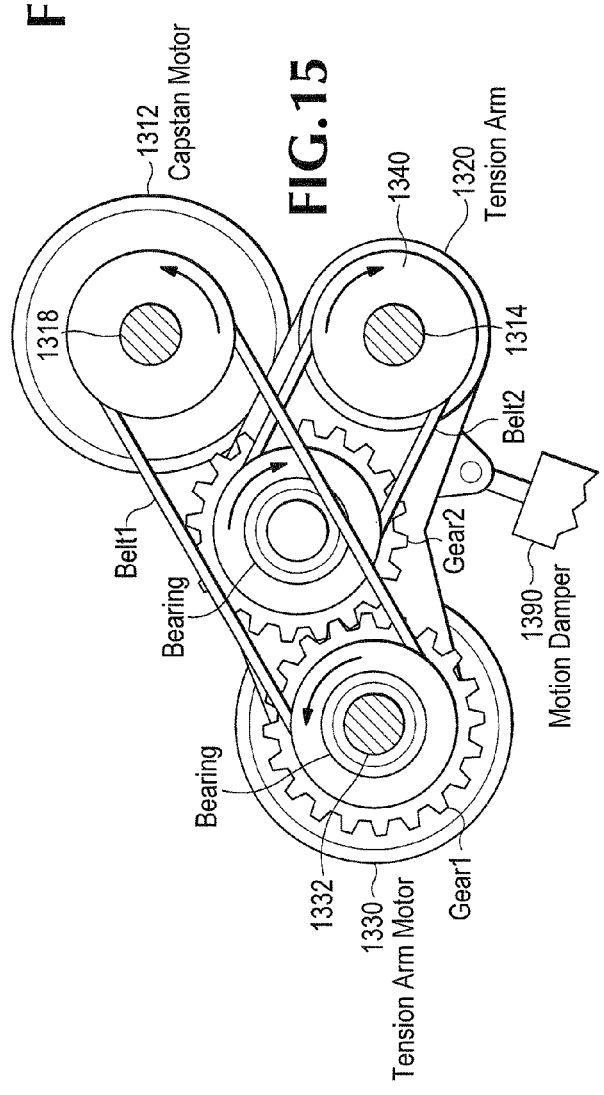

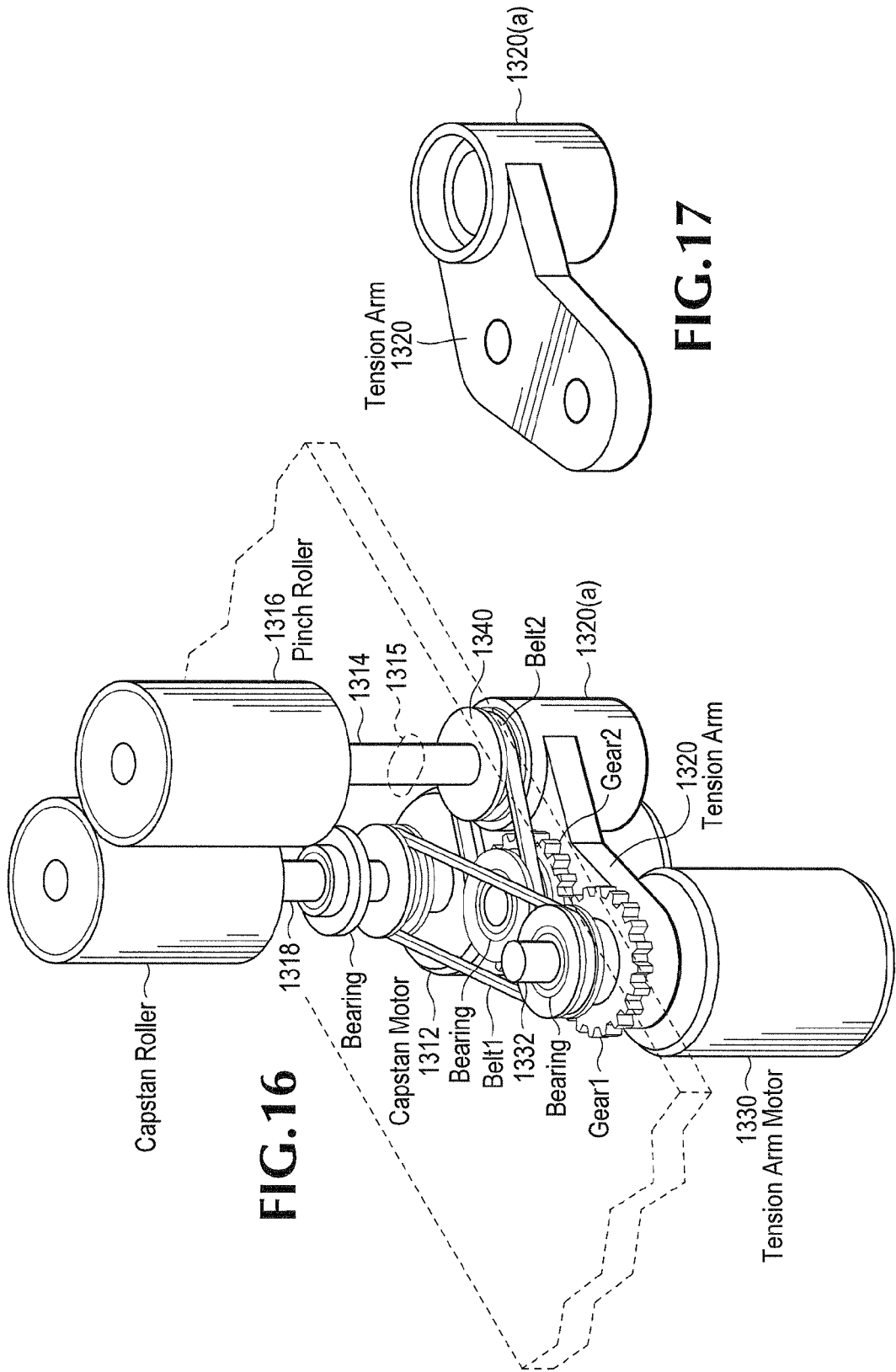

DYNAMIC THICKNESS ADAPTATION FOR AN IN-LINE SCALE

RELATED APPLICATIONS

This application is a continuation-in-part of co-pending U.S. application Ser. No. 12/817,087 filed Jun. 16, 2010, entitled ACTIVE ELECTRONIC DAMPING FOR AN IN-LINE SCALE, which is a continuation-in-part of co-pending U.S. application Ser. No. 12/562,798 filed Sep. 18, 2009, which is a continuation-in-part of U.S. application Ser. No. 11/855,130 filed Sep. 13, 2007, now U.S. Pat. No. 7,687,727; each of which is incorporated herein in its entirety by this reference as though fully set forth.

TECHNICAL FIELD

This invention pertains to methods and apparatus for accurately determining mass-related properties of an article, such as weight or moment of inertia, and more specifically it pertains to weighing articles that are in motion.

BACKGROUND OF THE INVENTION

Many weighing systems are known, some dating back to biblical times. More recently, weighing systems have been developed for weighing each one of a stream of articles, such as mail pieces or parcels moving through a transport or mail sorting system. Prior art systems of that type are shown, for example, in U.S. Pat. Nos. 7,096,152 and 3,648,839.

Some known systems rely on back-EMF or "Electro Magnetic Force Restoration" principles. According to one vendor, "an applied load is compensated for by an electromagnetically produced counterforce. A precision position control (optical) keeps the system stable. The slightest movement is detected, initiates a feedback circuit to run current through a coil and causes the load to be returned to its original position. The coil current, which is proportional to the weight, is transmitted to an internal A/D converter then processed in the microprocessor."

Commonly-owned U.S. Pat. No. 7,687,727 discloses an improved in-line scale for very fast, accurate measurement of moving items such as mailpieces moving along a transport system. However, inaccuracies in such measurements can result from variations in the thickness of the items under measurement. The need remains for improvements in in-line weighing systems.

SUMMARY OF THE INVENTION

In one class of embodiments, an article whose mass-related property is to be measured is presented, for example by entering a "weighing station" via a transport mechanism such as a belt transport. Details of such transport mechanisms are well known in various contexts, including mail sorting machines. In alternative embodiments, the weighing apparatus might be used separately, for example in a machine arranged to apply the correct postage to a mail piece.

In some embodiments, a weighing apparatus in accordance with the present disclosure receives an article that has a measured or otherwise known initial state of movement (or rest). There is also a predetermined or "commanded" final state of movement (or rest) of the article. And finally, a mechanism is provided that applies an impulse to move the object from its initial state to the commanded final state. (The term "mechanism" is used in this application in a broad sense. It is not limited to purely mechanical contrivances; to the contrary, it refers to any and all mechanical, electrical, optical, electromechanical systems, software controlled systems, and combinations thereof that provide the described functionality.)

The impulse-applying mechanism must include or be coupled to some means of measuring or capturing information as a proxy for the actual impulse. In other words, the impulse typically is measured indirectly. For example, a curve of the torque that applies the impulse through a motor can be used to infer sufficient information about the applied impulse. The measured proxy is then calibrated by articles of known mass-related properties and the calibrated values are used to determine the article's mass-related properties. The use of calibration allows considerable simplification to take place. As explained below, in a preferred embodiment, this approach obviates the need for actual or absolute measurements such as article velocity. Indeed, velocity is not critical and need not be measured in absolute terms. One primary improvement of the present invention over prior art is that it allows weighing of articles at normal transport speeds; for example, hundreds of inches per second for mail pieces.

In one embodiment, a method for weighing a moving article on the fly comprises the following steps:
 receiving an incoming article having a first velocity;
 without stopping the article, gripping the article between a capstan roller and an opposed pinch roller;
 synchronizing rotation of the pinch roller and the capstan roller to avoid slippage of the article gripped between them;
 providing a capstan servo motor having a shaft operatively coupled to the capstan roller;
 providing a first servo amplifier coupled to the capstan servo motor so as to form a first closed-loop servo system for driving the capstan servo motor and for monitoring torque applied by the capstan servo motor;
 in the first servo amplifier, commanding the capstan servo motor to a predetermined, constant command speed that is different from the first velocity of the article;
 beginning after the article is gripped between the pinch roller and the capstan roller, weighing the article on the fly by acquiring a series of capstan servo motor torque sample data as the article moves between the pinch roller and capstan roller, so that the captured torque data reflects the torque applied by the capstan servo motor to change the article speed from the first velocity to the command speed;
 storing the acquired torque sample data in a memory;
 providing a second closed-loop servo system arranged for controllably repositioning the pinch roller relative to the capstan roller to apply a controllable gripping force on the article as the article moves between the pinch roller and capstan roller, wherein the second closed-loop servo system provides an indication of a current position of the pinch roller as the article moves between the pinch roller and capstan roller;
 detecting a change in the current position of the pinch roller responsive to a change in thickness of the article as it moves along still gripped between the pinch roller and the capstan roller;
 correcting the stored capstan servo motor torque data to remove a torque error caused by the change in thickness of the article; and
 processing the corrected torque data to determine a weight of the article independently of the actual speed of the article.

Additional aspects and advantages of this invention will be apparent from the following detailed description of preferred embodiments, which proceeds with reference to the accompanying drawings.

BRIEF DESCRIPTION OF THE DRAWINGS

FIG. 9A is a top plan view of a transport assembly of a second embodiment of an in-line weighing apparatus in a non-weighing state.

FIG. 9B is a top plan view of the transport assembly of FIG. 9A in a weighing state.

FIG. 10A is an exploded, perspective view of the transport assembly of FIG. 9A.

FIG. 10B is an assembled, perspective view of the transport assembly of FIG. 9A.

FIG. 11A is a top plan view of a transport assembly of a third embodiment of an in-line weighing apparatus in a non-weighing state.

FIG. 11B is a top plan view the a transport assembly of FIG. 11A in a weighing state.

FIG. 11C is an exploded, perspective view of the transport assembly of FIG. 11A.

FIG. 11D is an assembled, perspective view of the transport assembly of FIG. 11A.

FIG. 14 is a top plan view the weighing apparatus of FIG. 13.

FIG. 15 is an enlarged top view taken along line 15-15 of FIG. 13 showing drive linkage detail of the weighing assembly of the weighing apparatus of FIG. 13.

FIG. 16 is a perspective view of the weighing assembly with the deck shown in phantom.

FIG. 17 is a perspective view of a tension arm standing alone.

DETAILED DESCRIPTION OF PREFERRED EMBODIMENTS

Figure 1:
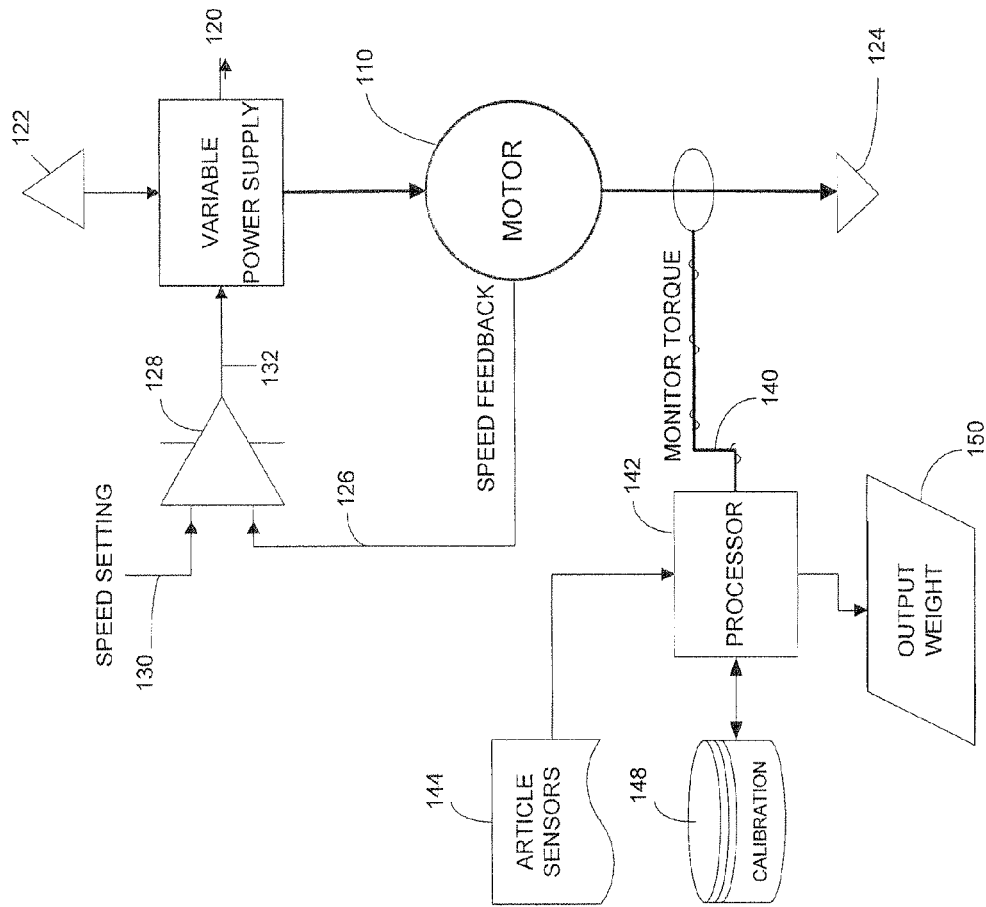
FIG. 1 is a simplified electrical schematic diagram illustrating one embodiment of a system for weighing articles on the fly.

Turning now to FIG. 1, a simplified electrical schematic diagram is shown illustrating one embodiment of a system for weighing articles on the fly. In FIG. 1, a servo motor 110 is driven by a variable power supply 120 which is coupled to a power source 122. In operation, current flows through the motor to ground 124. A speed sensor (not shown) is coupled to the motor 110 to provide a speed feedback signal 126. Various sensors can be used such as shaft encoders, optical sensors, etc. to accurately monitor speed or rotation of the motor 110. The speed feedback signal is provided to an error amplifier 128, such as an op-amp, which compares the current speed to a predetermined input speed setting 130. An error signal 132 related to the difference between the two inputs is input to the power supply 120 to control the motor current through 110 so as to maintain the motor speed at the speed setting 130 in the steady state. A change in the load on the motor, however, will result in a transient in the motor torque indicative of that change in loading. That transient torque level may be captured as a proxy indicative of an impulse applied to the article.

Still referring to FIG. 1, the motor torque is monitored and a motor torque signal 140 related to the monitored torque level, for example a digital stream of samples, is input to a processor 142. This is not necessarily a stand-alone processor, but it may be any programmable digital processor, or a software component arranged to implement the described functionality on a dedicated processor or as part of a larger system. Article sensors 144, for example optical sensors (photodiodes, etc.), detect when each article of interest enters and leaves the weigh station, as further explained below with reference to other figures. A calibration data store 148 stores calibration data, which can include steady-state or "no load" measurements, taken when no article is present, as well as data taken from measurement of articles having known mass. This data is used by the processor 142 to determine the article weight, and the result is output, for example displayed, printed, or stored in digital file, as indicated at 150 in the drawing.

Figure 2:
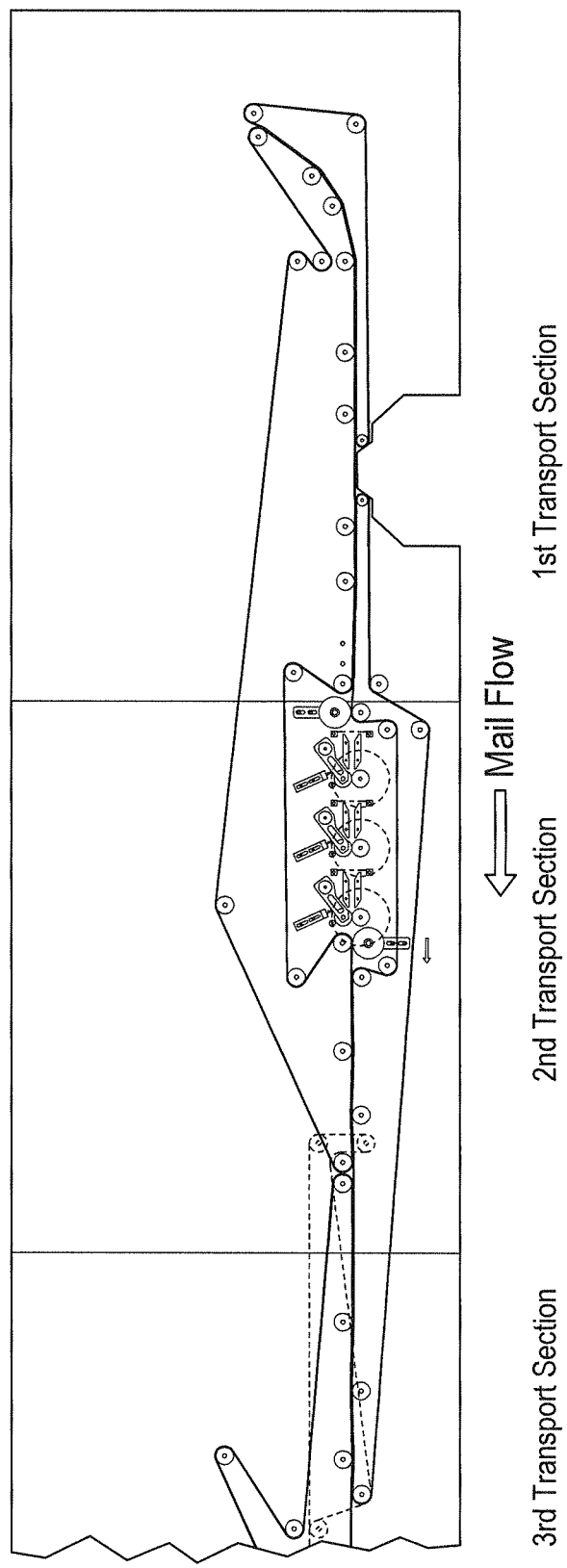
FIG. 2 is a mechanical drawing in top view of an article transport apparatus including a weigh station in accordance with one embodiment of the present invention.
Figure 3:
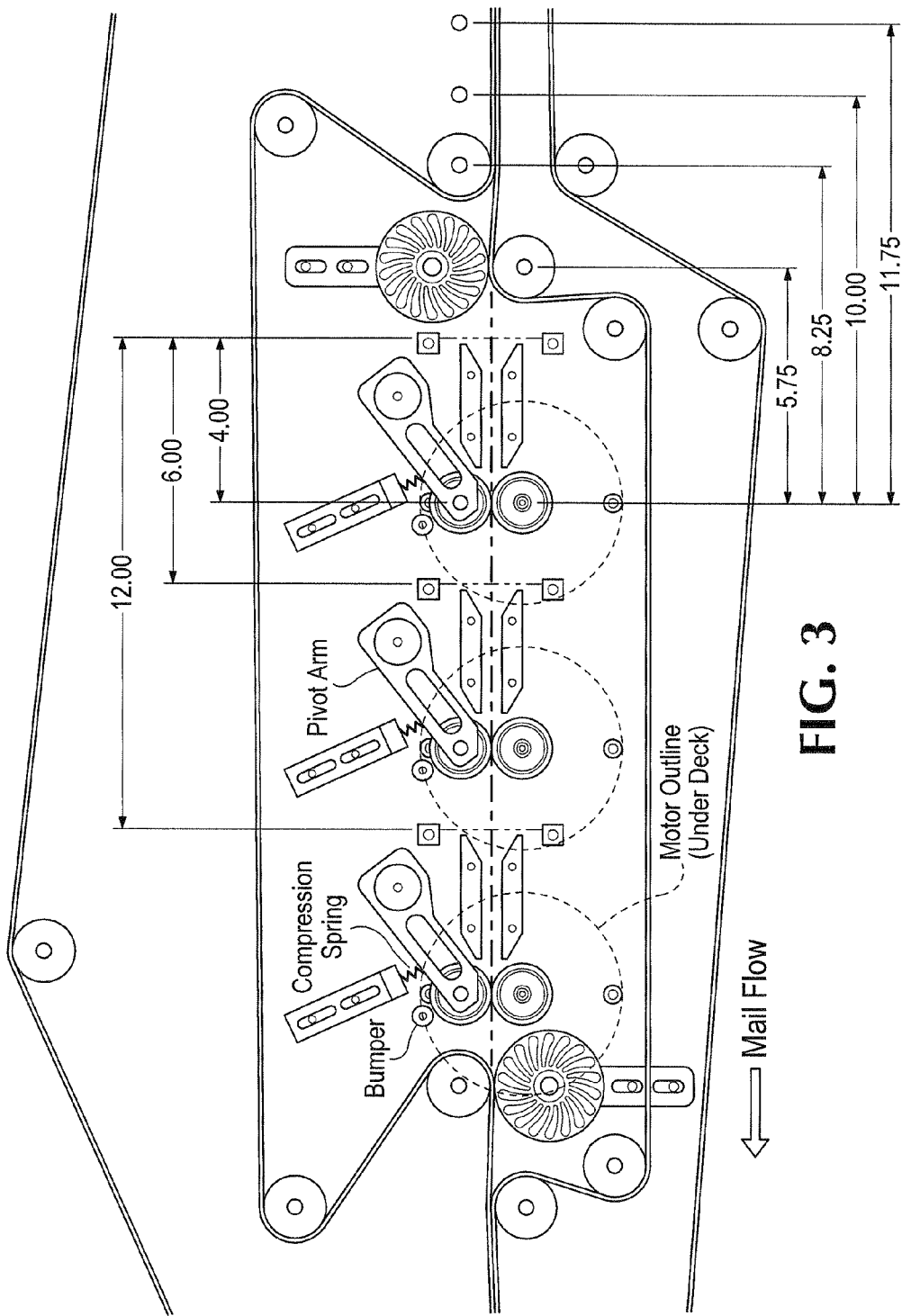
FIG. 3 is a mechanical drawing in top view showing greater detail of the weigh station of FIG. 2.

FIG. 2 is a mechanical drawing in top view of a belt-driven article transport apparatus. In operation, articles move from right to left in the drawing, from a first transport section, into a second transport section (where a weigh station will be implemented as described below), and thence to a third or output transport section on the left. FIG. 3 is a mechanical drawing in top view showing greater detail of the second transport section of the apparatus of FIG. 2. Referring to FIG. 3, articles enter from the right through a variable pinch roller pair, past a first photosensor, between a pair of fixed non-friction guides, and into a first motor assembly. The first photo sensor, together with second and third photo sensors described below, generally correspond to the article sensors 144 of FIG. 1. The first motor assembly comprises a motor driven hub, and an opposing spring-loaded pinch roller mounted on a pivot arm, controlled by a solenoid (not shown), for controllably moving the opposing roller into contact or near contact with the said hub so as to form a pinch roller pair for engaging the moving article. The first motor operates at the same speed as the belt-driven first transport section to normalize the speed of the article for articles of different lengths. Accordingly, each article enters the second transport section at the same speed. The actual or absolute value of that speed is not critical for present purposes. In contradistinction to prior art, the present system does not rely on speed measurements.

Figure 4:
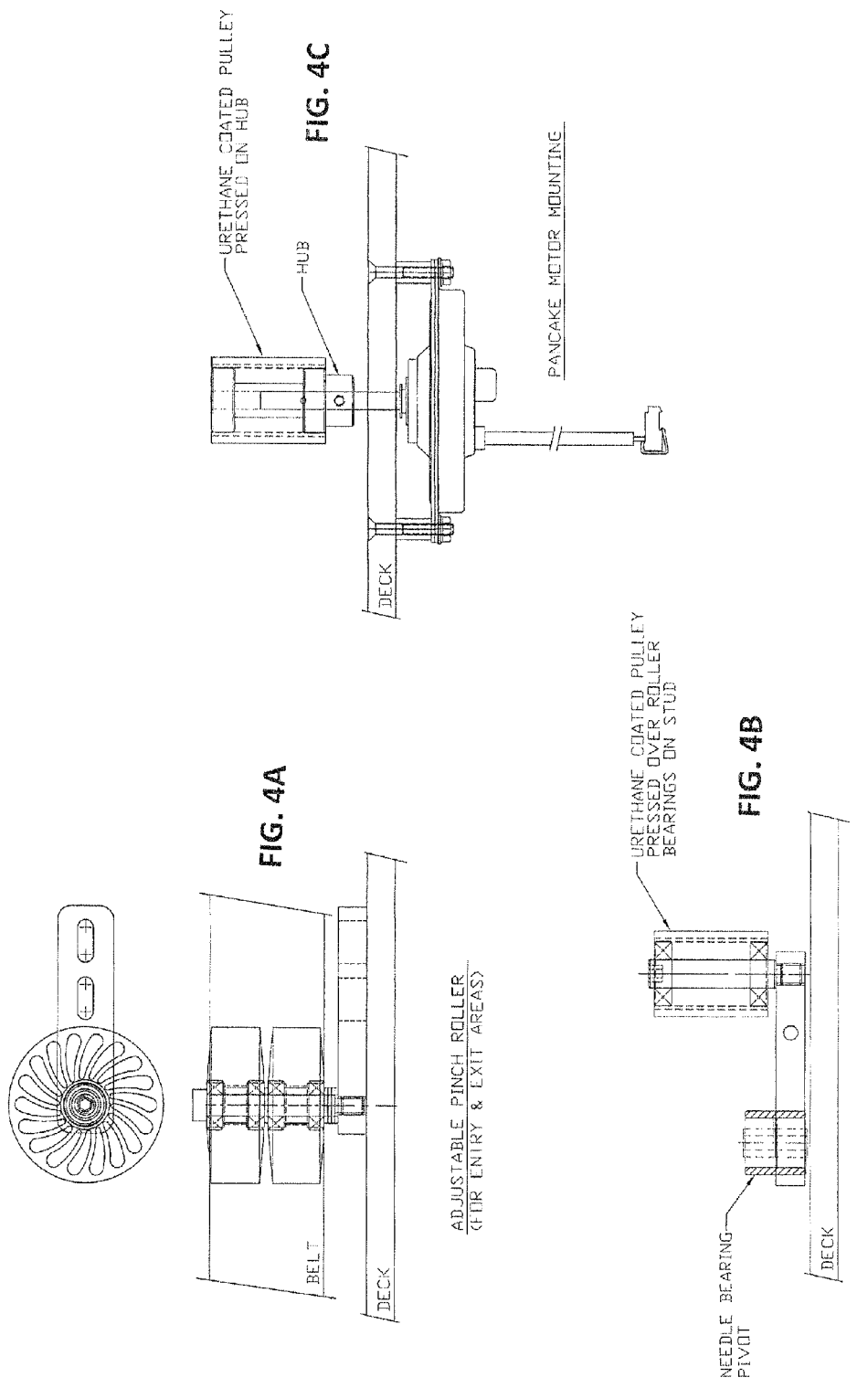
FIG. 4A comprises top view and cross-sectional views of an adjustable pinch roller assembly for use in the transport apparatus of FIG. 2.
FIG. 4B is a cross-sectional side view of a pivot roller assembly of a type useful in the weigh station of FIG. 2.
FIG. 4C is a side view of a pancake motor mounting in the article transport apparatus of FIG. 2.

A second photo sensor detects movement of the article from the first section into the second section. The second section comprises a second motor assembly, similar to the first section. However, in accordance with the present invention, the second section is modified by replacing the common DC brush motor with a precision servo system further described below. FIG. 4A comprises top view and cross-sectional views of one example of an adjustable pinch roller assembly for use in the transport apparatus of FIG. 2. FIG. 4B is a cross-sectional side view of a pivot roller assembly of a type useful in the weigh station of FIG. 2. FIG. 4C is a side view of a pancake motor mounting in the article transport apparatus of FIG. 2.

Figure 5:
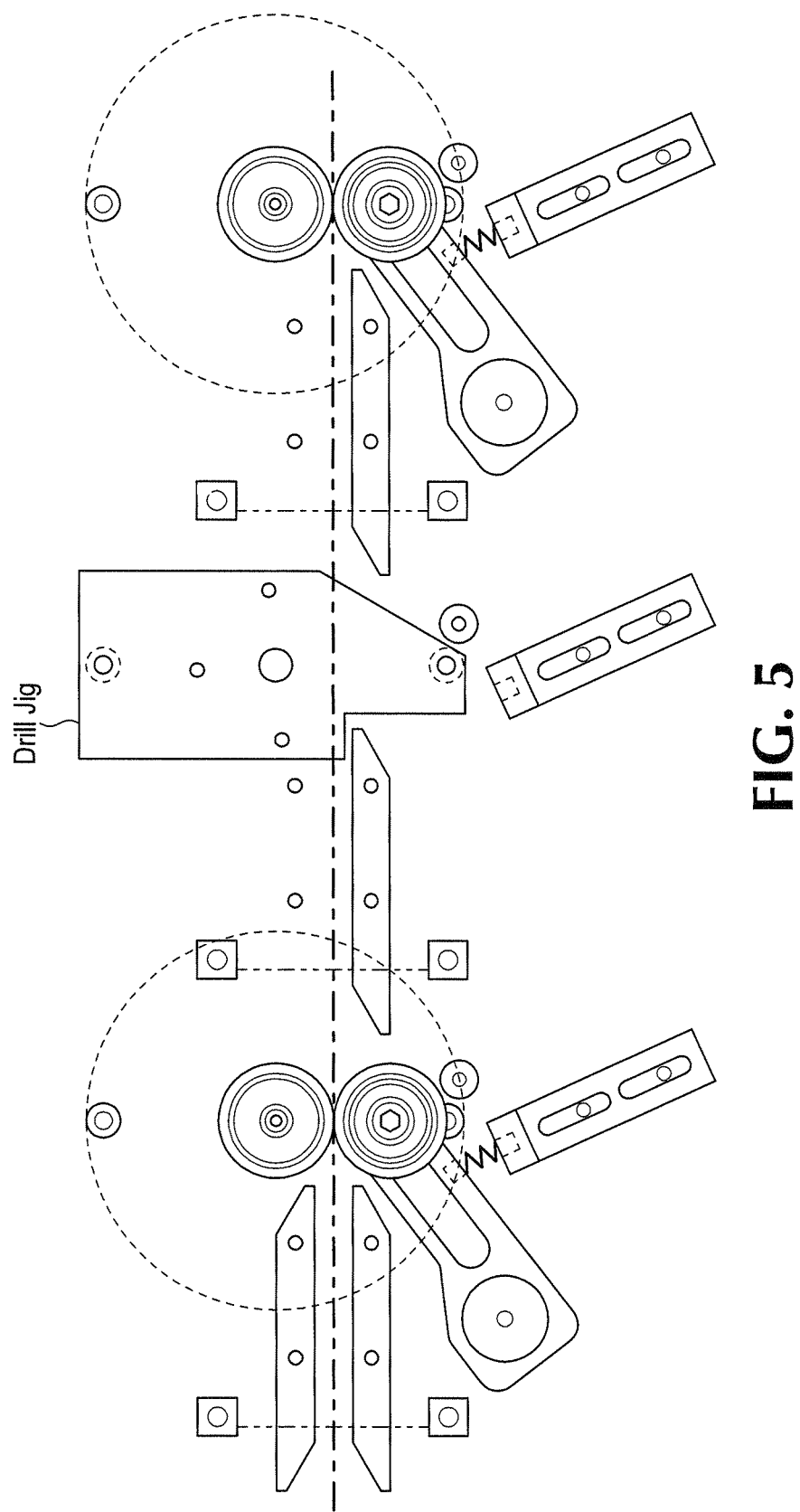
FIGS. 5-6 are mechanical drawings in top view illustrating a procedure for replacing a pancake motor with a precision servo motor in the assembly of FIG. 2.
Figure 6:
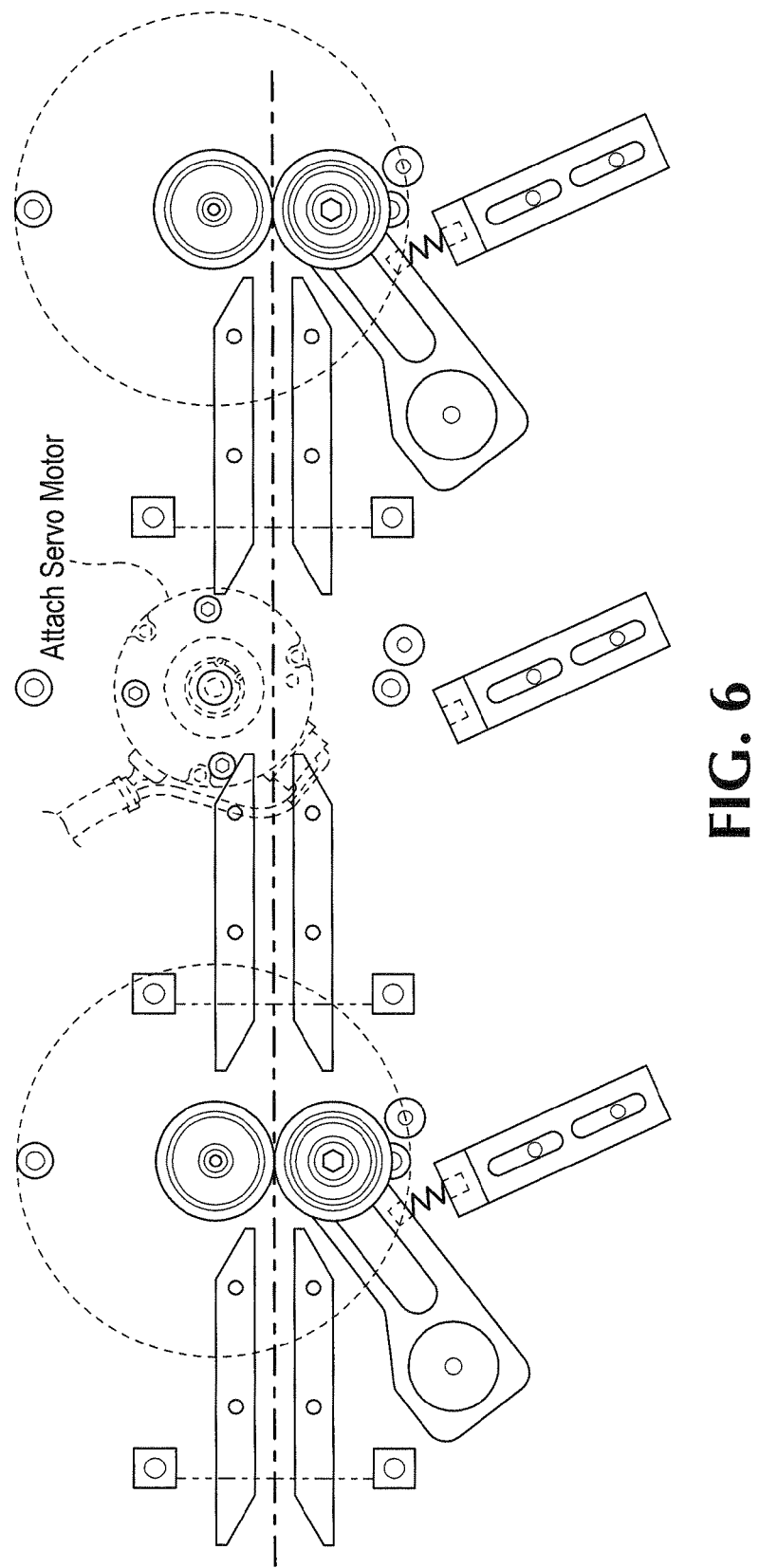
Figure 7:
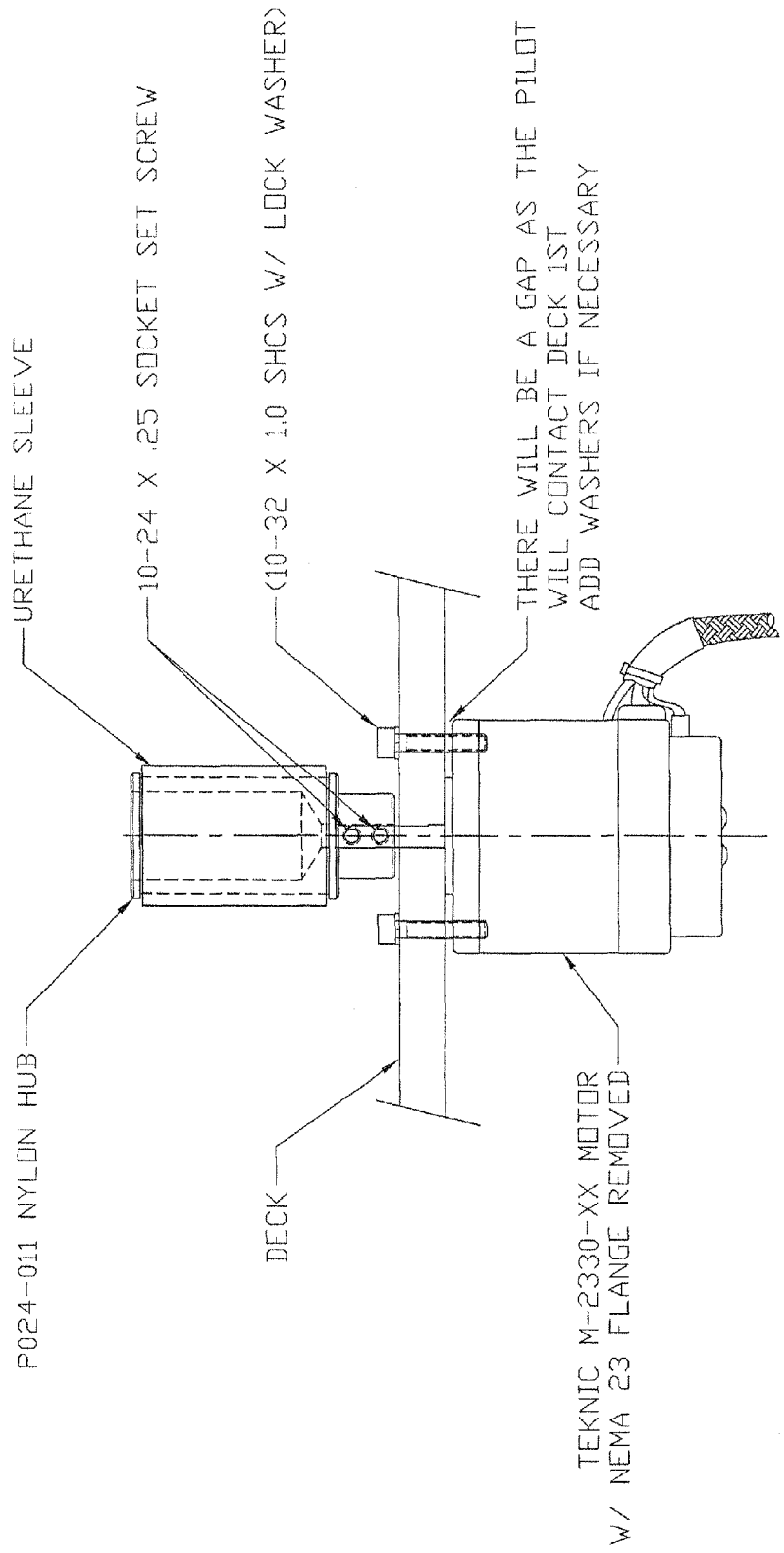
FIG. 7 is a side view illustrating a precision servo motor installed below a transport deck of a transport assembly with a sleeved hub installed for engaging an article moving through the transport assembly.

FIGS. 5-6 are mechanical drawings in top view illustrating a procedure for replacing a pancake motor with a precision servo motor in the assembly of FIG. 2. The Teknic model M-2330 motor is just an illustrative example of such a servo motor. Other precision motors can be used and should be considered equivalents. FIG. 7 is a side view illustrating a precision servo motor installed below a transport deck of a transport assembly with a sleeved hub installed for engaging an article moving through the transport assembly. Now we assume such modifications have been done, as described in the drawing, so that the second section motor assembly now employs a servo system in lieu of the pancake type motor used in the first and third transport sections. A third photo sensor detects movement of the article from the second section into the third section. The third transport section (see FIG. 2) re-establishes the article speed to the system belt speed after weighing.

Accordingly, in one embodiment, a transport mechanism (first section) projects an article at some initial velocity into the measuring apparatus. For example, in mail piece handling, a belt driven transport mechanism is commonplace. That velocity is known to the system itself (for such things as spacing the articles along their route), but its value is not important and indeed is neither calculated nor used in the process of weighing the article. This ignorance by the weighing mechanism of the initial velocity of the article is material, since much of the prior art measures mass by calculating the difference between initial and final velocities of the article. Since the initial velocity is not provided to the weighing apparatus, such approach is precluded.

In one embodiment (see below for others) the article then enters a measuring apparatus which pinches the article between two rollers. In the illustrative example in the drawings, the "measuring apparatus" generally corresponds to the second transport section, also referred to as a weigh station. The measuring apparatus has been commanded to output the article at a second velocity (which may be higher or lower than the input velocity). This corresponds to the speed setting 130 of FIG. 1. The pinch rollers are driven by a servo mechanism (see FIG. 1) that measures the angular velocity of a motor that drives one of the rollers, compares it to the desired angular velocity (at which the article would be moving at the ordered output velocity), and supplies sufficient torque to achieve the desired final angular velocity. The specific profile of intermediate velocities ordered for or achieved by the system are unimportant, though the proposed system includes devices that accelerate and then decelerate the article (or the other way around) so that its final velocity may be the same as its initial velocity. So, for example, the weigh station may first accelerate, and then decelerate the article, arriving at the same velocity as the initial velocity, but gathering torque data in the meantime.

The solenoids that operate the pinch roller pivot arms are controlled so that, while an article is in the second section (weigh station), as detected by the photo sensors, the first and third transport section rollers are withdrawn from the motor hubs so that the weigh station pinch roller assembly supports the article. In this way, acceleration and deceleration of the article are accurately reflected in the servo loop that drives the weigh station servo motor.

It is important to state that it does not matter what that final angular velocity is. Unlike prior system, such as those disclosed on U.S. Pat. No. 7,096,152 or 3,648,839, the proposed system makes no absolute measurements at all. It works on calibration of torque, not absolute measurements of current or velocity.

The application of a precision instrument grade servo system to the problem of weighing mail pieces or parcels while they are moving at a high speed enables multiple approaches to mass calculation. In a preferred embodiment, the servo mechanism is in continuous communication and control of all of the moving roller system components prior to introduction of the item to be weighed. In this way a state of nominal motion or equilibrium can be established and related to the zero state of the scale. (Recall zero state data can be stored in data store 148 of FIG. 1.) Upon introduction of the subject article (which may be a mail piece, a parcel, or other object), this equilibrium is disturbed.

The servo mechanism, by way of electronic and mechanical feedback loops, rapidly responds by injecting correcting signals to re-establish the nominal motion state. By measuring the error-correcting signals generated by the servo system and scaling by a calibration factor, a mass calculation can be made. Other methods of using servo data are described later.

Since much of the prior art discusses calculating the weight (mass) of the articles, it bears mentioning here that the proposed system can work quite well with no actual calculation of article mass at all. All that really matters is the comparison of the mass-related property of the article to the mass-related properties of one or more calibration articles. Experimental data from a prototype is discussed later.

Other embodiments include but are not limited to the following:

Maintaining a state of angular momentum associated with the nominal zero state and then measuring the incremental torque required to re-establish the velocity of the nominal zero state but now including an incremental mass (e.g. a mail piece).

Maintaining a nominal zero state of motion with an associated constant torque and then measuring the difference in angular displacement of the rotating components when an incremental mass is introduced. The difference in angular displacement is compared between the zero and the loaded state over equal and fixed time intervals or over intervals whose ratio is known to the system.

Maintaining a nominal zero state of motion with an associated constant torque and then comparing the time differential required to attain a fixed displacement.

Introducing an acceleration command and then measuring the torque differential required to maintain that acceleration.

Non-linear relationships between the mass-related property of the article and the measured property are also envisioned by the proposed system. In such a case, sufficient calibration is required as to adequately define the relationships. It is not a requirement in every embodiment that the article be propelled by a transport mechanism. It can for example, be self-propelled. In one embodiment, the object is a truck which moves at some measured velocity into the weighing apparatus. One possible system use is sorting the objects, such as mail pieces, into bins based on their determined weight (though this sortation is not a requirement of the proposed system). Another use may be to assess taxes based on vehicle weight (for, say, a truck).

FIG. 9A is a top plan view of a transport assembly of a second embodiment of an in-line weighing apparatus in a non-weighing state. This type of transport assembly may be integrated along a transport track of an automatic mail piece sorter machine, or the like, or may be implemented in a stand-alone weighing machine. In general, a mail piece 900 travels from left to right in the drawing. In FIG. 9A the mail piece 900 is engaged between main transport belts 910 and 902 which move synchronously at a predetermined system transport speed. This may be, for example, on the order of 150 inches per second. Belt 902 may be driven and or guided by rollers 904, 906 etc. The left transport belt 910 may be driven and or guided by rollers marked A, B and C for reference.

The left transport belt 910/902 conveys the mail piece 900 into a weighing station 950, further described below. After weighing, the mail piece proceeds to exit the weighing station 950 by engagement in between right transport belt 918 and belt 902, again moving at the system transport speed. The right belt 918 is guided and or driven by rollers F, G and H as shown. These various belts are shown also in an exploded view in FIG. 10A. In the weighing station 950, the mail piece 900 changes speed, perhaps more than once, but it does not stop. This example has the advantage of maintaining a two-sided pinch to control mail pieces as they travel through the system.

Turning now to the weighing station 950 in FIG. 9A, a front weigh belt 960 is shown, driven by a motor 966 around a series of guide rollers L, M, N and O. The front weigh belt 960 is spaced apart from the mail piece 900 in the non-weighing state shown in FIG. 9A. A rear weigh belt 940 is entrained on a series of guide rollers, generally as indicated, so that belt 940 also is spaced apart from the path of the mail piece 900 in this non-weighing state. The weigh belts 940, 960 are spaced apart from the transport belts 902, 910, 914, 918 in the dimension into the page, so they do not conflict, as seen in the exploded view of FIG. 10A. ("Front" and "rear" are arbitrary labels in this description.)

FIG. 9B is a top plan view of the transport assembly of FIG. 9A in a weighing state. In this state, the mail piece 900 has entered the weigh station 950. The mail piece is disengaged from the transport belts as the transport belts are repositioned into a weigh state spaced apart from the mail piece. To do so, guide rollers C, D, E and F are moved up as shown by the small arrows in FIG. 9B. Consequently, belts 910, 914 and 918 do not contact the mail piece at this time. Rather, the mail piece is now in contact with the rear weigh belt 940. In the lower portion of the drawing, the lower transport belt 902 is not affected. Rather, in the weigh state, the front weigh belt 960 is repositioned to contact the mail piece, so that the mail piece is gripped in between the front and rear weigh belts only. To reposition the front weigh belt guide rollers M and N are moved upward, as indicated by the small arrows in the drawing. The belt 960 thus moves the mail piece temporarily off of the transport belt 902 as further explained below.

The weigh belts are synchronized to the same speed, for example 250 inches per second, which represents acceleration from the transport belt speed (150 ips in the example). The weigh belts should be coupled to a precision servo motor so that motion of the weighing belts translates to a corresponding rotation of the motor, and vice versa. In other words, there should be little or no slippage between the servo motor and the weighing belts. A separate motor may be coupled to each belt, as long as the motors and respective belts are synchronized, or a single motor may be used. Two motors are shown in the illustrated embodiment.

An example of a suitable servo motor is commercially available Teknic model M-2330. This is an instrument grade, brushless AC servo motor with integrated encoder. Peak torque is on the order of 160 ounce-inches. Other precision motors can be used and should be considered equivalents. A high power density motor is preferred for building a weighing system into a confined space. The shaft encoder may provide, for example, on the order of 4,000 to 8,000 counts per revolution.

As mentioned, FIG. 10A is an exploded view of the transport assembly of FIG. 9A. In this view, a motor 946 drives the rear weigh belt 940. A second motor 966 drives the front weigh belt 960. A second ("lower") set of front and rear weigh belts, 964 and 944, respectively, are shown below the transport belts 902 etc. These operate in the same manner as the upper weigh belts 960, 940 as described. They should be synchronized to the upper weigh belts, and may share common drive and control elements. This may be termed an interleaved belt system, in that the weigh belts are above and below the transport belts.

FIG. 10B is an assembled, perspective view of the transport assembly of FIG. 9A. Here is can be seen that the upper weigh belts (940,960) are located above the transport belts, and the lower weigh belts (are located below the transport belts. All three pairs of belts are sized and spaced for engaging the mail piece 900—shown in dashed lines—at the appropriate times.

In operation of the assembly of FIGS. 9 and 10, a mail piece 900 is conveyed from left to right (FIG. 9A), initially by the transport belts. The intake transport belts are moving at a predetermined initial velocity, for example the system transport speed in a sorter system, and thus the mail piece enters the weigh station at that initial velocity. Since the mail pieces may vary in length, for example from 5 inches to 11.5 inches, short pieces would otherwise slow down before they hit the main rollers (weigh station) and produce a erroneous reading. To avoid that result, the first pair of belts maintains the velocity of these pieces, and then releases just as the piece reaches the main rollers.

Accordingly, when the mail piece arrives in the weigh station 950 (as detected, for example, by photo sensors described later), the piece is released from the transport belts, and substantially immediately gripped in the upper and lower weigh belts (FIG. 9B), by the actions described above. This process may be enabled by a control system similar to the one described below.

In the weigh station, the piece may be accelerated and or decelerated by the servo motor as discussed earlier to accomplish a weighing operation. The weigh belts thus change speed to make the measurement; the transport belts preferably operate at constant speed. The piece then exits the weigh station, continuing to move from left to right in FIG. 9, essentially by reversing the above actions. That is, the assembly switches from the weigh state back to the non-weigh state. The weigh belts are disengaged from the mail piece, and substantially immediately the transport belts re-engage the mail piece. The mail piece may be restored to the initial velocity. In this way, a series of mail pieces may move through the weighing station, and be weighed "in-line" without affecting a larger system in which the weighing apparatus may be installed. Below we describe in more detail how the weight measurements are electronically acquired.

FIG. 11A is a top plan view of a transport assembly of a third embodiment of an in-line weighing apparatus in a non-weighing state. Front and rear primary transport belts 1112 and 1102, respectively, convey a mail piece 1100 from left to right in the drawing. The mail piece is gripped in between them, as shown, prior to weighing, and after weighing. In this example, dimensions at 5-inch intervals are shown, based on an expected five-inch minimum mail piece length.

A second pair of transport belts 1122 front and 1120 rear, are arranged to convey a mail piece, also at normal transport belt speed, when the system is not performing a weighing operation. The second transport belts 1122, 1120 are spaced above the primary transport belts (as well as the weigh belts), as best seen in the exploded perspective view of FIG. 11C. The second transport belts "bridge the gap" in the non-weighing state from the primary transport belts at the intake (left) side to the same belts at the output (right) side as the primary transport belts are routed around the weigh station. This embodiment ensures that even a 5-inch envelope is pinched between two belts at all times.

A third pair of transport belts 1130, 1132 (FIG. 11C) are sized and arranged like the second pair, but are instead located below the primary transport belts. In other words, these belts are interleaved, as best seen in the exploded view of FIG. 11C. That is, the second pair of transport belts 1120, 1122 are located above the primary transport belts, while the third pair of belts 1130, 1132 are located below the primary transport belts 1102, 1112. All three pairs of belts are sized and spaced for engaging the mail piece 1100 at the appropriate times (and not during actual weighing of the mail piece). The total height of the three belts, plus spacing, would be similar to the minimum expected height of a mail piece, for example a 3½ inch minimum for a standard letter. A pair of weighing belts 1114, 1116 are spaced apart from the transport belts and not contact the mail piece in this non-weighing state (FIG. 11A).

FIG. 11B is a top plan view of the transport assembly of FIG. 11A in a weighing state. The mail piece 1100 has moved into the weighing station. The mail piece is released from the primary transport belts, and also released from the second and third pairs of transport belts. The mail piece is now gripped between the weighing belts 1114, 1116 for weighing "on the fly" i.e., without stopping its travel. To do this, rollers P and Q are repositioned to relocate the rear weigh belt 1114, as indicated by two small arrows, to bring the belt 1114 into contact with the mail piece. This also brings the opposite face of the mail piece into contact with the stationary front weigh belt 1116. The mail piece no longer contacts any of the transport belts. Weighing is conducted as the mail piece moves along gripped in between the weigh belts. As before, the weigh belts are coupled to a suitable, precision servo motor.

The piece then exits the weigh station, continuing to move from left to right in FIG. 11, essentially by reversing the above actions. That is, the assembly switches from the weigh state back to the non-weigh state. The weigh belt 1114 is disengaged from the mail piece, and consequently the transport belts re-engage the mail piece. In particular, depending on the size of the mail piece, the second and third transport belts ensure that the piece moves along into re-engagement with the primary transport belts 1102, 1112 on the exit (right) side of the assembly. The mail piece may be restored to its initial velocity. FIG. 11D shows the transport assembly in an assembled, perspective view, without a mail piece.

Figure 12:
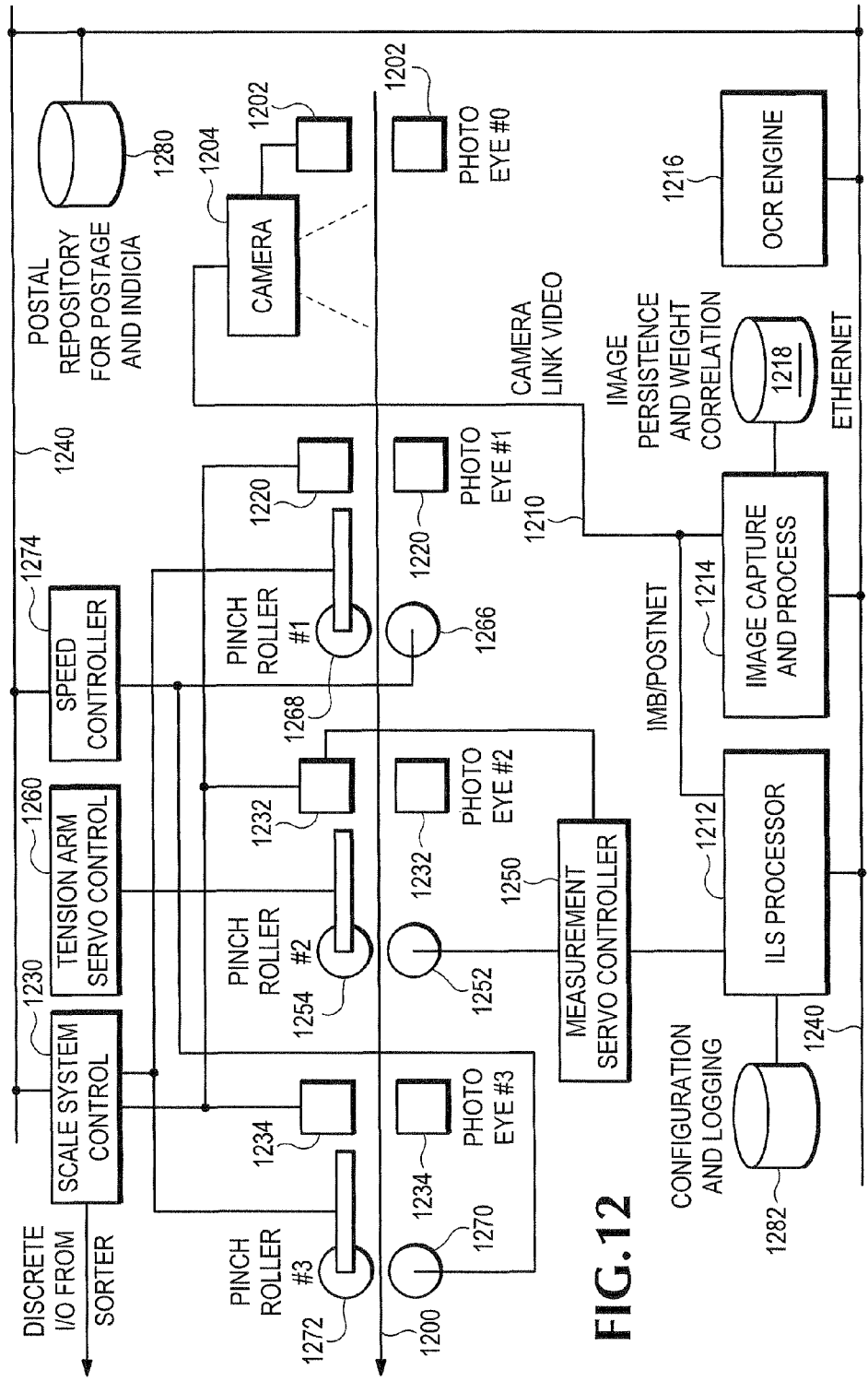
FIG. 12 is a simplified electronic system diagram of a dual-servo controlled in-line weighing apparatus in the context of a mail sorting system.

FIG. 12 is a simplified system diagram of a dual-servo controlled, in-line weighing apparatus in a postal sorting system. This type of system may be called "dual-servo" (or in some cases "2-axis"), as a first servo loop controls a first servo motor for a weighing operation, and a second servo loop controls a second servo motor for gripping tension control during the same weighing operation. In the illustrated embodiment, a transport 1200, typically comprising moving belts, moves a stream of mail pieces from right to left in the drawing. Such transports may move the mail at speeds on the order of 10 ft./sec although the particular speed is not critical to this disclosure. We refer to this quantity as the "system speed" or "transport speed."

At the right or intake side of the drawing, a "PHOTO EYE #0" comprises a light source and a corresponding photo detector 1202, arranged to detect the arrival of an incoming mail piece (not shown) as the leading or front edge of the mail piece traverses the light beam. The resulting electrical signal can be used to trigger a camera 1204 to start a new image capture. The camera then uploads image data to an image capture and processing component 1214. This process preferably is implemented in software, and may be implemented in the ILS Processor 1212 in some embodiments. The image capture process 1214 stores the mail piece image data in a datastore 1218. In some embodiments, the system may be coupled to another database, e.g. an postal service ICS database, in which case the image data may be stored there. After weighing, the ILS Processor stores the determined weight of a piece in the database 1218 in association with the corresponding image data.

The image capture process 1214 may utilize an OCR engine (software) 1216 to extract or "read" a destination address, or at least ZIP code, from captured mail piece image. These components may communicate over a local network 1240, for example an Ethernet network. Destination address data also may be stored in 1218 in association with the item image or other identifying data. In an embodiment, ID Tag data from an ICS may be used as an identifier.

Another database 1280 stores data for a batch of mail to be weighed in the ILS. The database 1280 may include information about the mail pieces in the batch and the postage paid for mailing the pieces. The database 1280 may include data or a machine-readable "manifest" provided by a sender or pre-sort house. For example, it may have a list of the mail pieces in the batch. They may be listed individually, by destination address, destination postal code, or using an internal ID number. Or, there may simply be a listing of the numbers of items, in total, or per zip code range, or per individual zip code. Other variations may be provided by a mailer for its own internal purposes.

The database 1280 preferably includes postage information as well. This may be the actual amount of postage paid for each individual item, where individual items are listed. Alternatively, summary data may be used where mail pieces are grouped or aggregated such that a bunch of items have the same postage paid. The database 1280 may include mailer permit information, postage rates, discounts, etc. Using this information, the ILS Processor 1212 or another process can correlate the mail pieces reflected in the manifest in database 1280, with the weights of the corresponding pieces, stored at 1218. It can determine the appropriate postage for each piece, and compare the actual postage paid for the piece. The difference, if any, is owed to the postal service (assuming the subject mail piece is processed by the postal service). In some applications, this system may be used to correct the postage for a batch (or individual items) before submission to the postal service.

Next we proceed to the weighing operations. After the envelope passes by the camera 1204 (again, moving right to left in the drawing), a second photo detector pair ("PHOTO EYE #1") 1220 detects the leading edge entering the in-line scale or weighing region. The photo detector 1220 is coupled to a scale system controller 1230. A third photo detector pair 1232, and a fourth photo detector pair 1234 also are coupled to the scale system controller 1230. Operation of these devices is described below. The scale system controller 1230 may be connected by any suitable data network arrangement, such as an Ethernet network 1240, for communication and data transfers with other components as indicated in the drawing, and with the sorter system controller (not shown).

Figure 13:
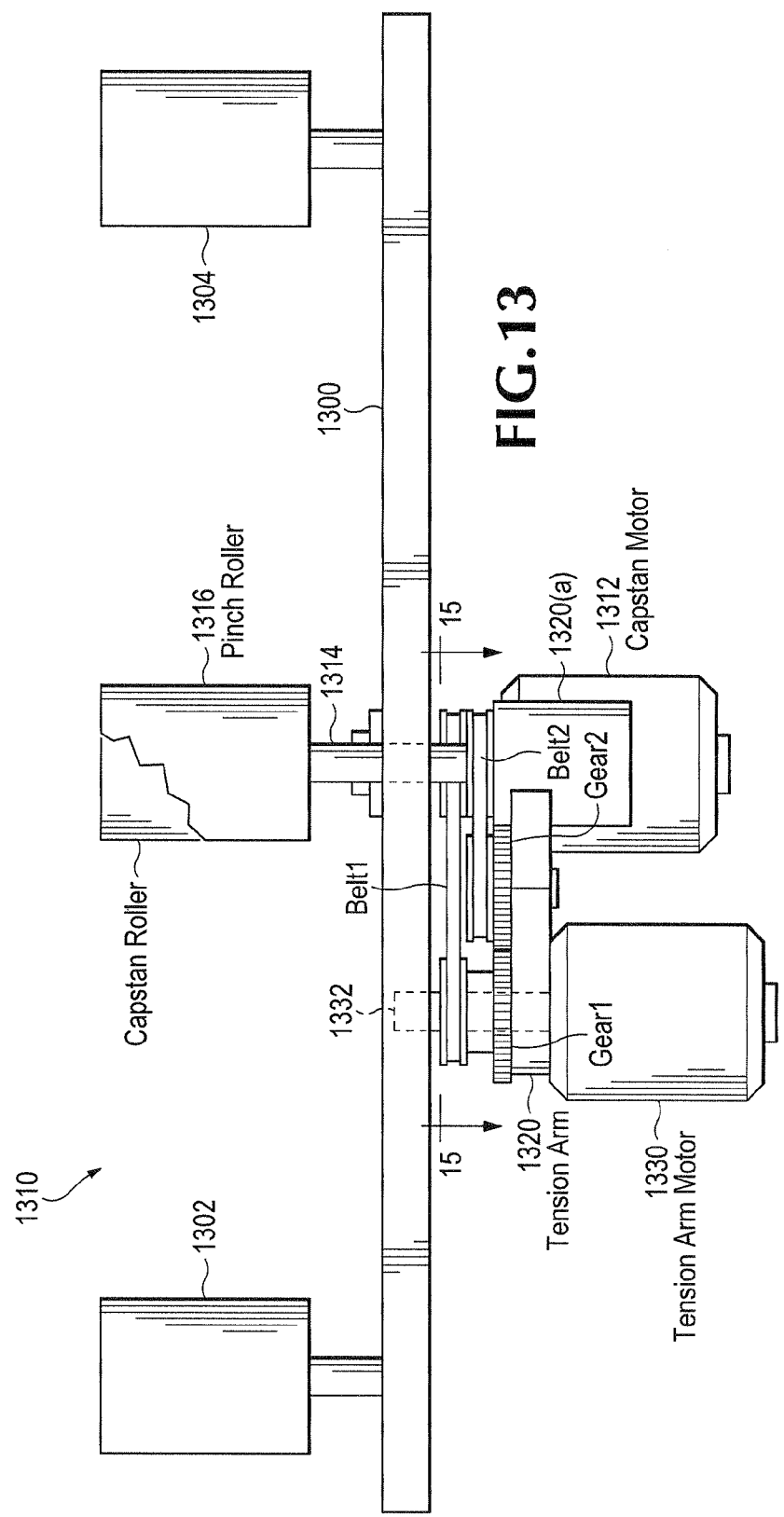
FIG. 13 is a side view of an embodiment of a dual-servo in-line weighing apparatus.

Referring again to FIG. 12, a first servo control system is driven by the measurement servo controller 1250. The photo detector 1232 is coupled to the measurement servo controller, as shown, to detect a mail piece entering the weigh station. In addition, the photo eye detects the trailing edge of the mail piece, which indicates that the piece has cleared the pinch roller #1 and therefore is ready for weighing. The measurement servo controller is coupled to a capstan motor 1252 for weighing operations. During a weighing operation, the mail piece is gripped between a capstan roller coupled to the capstan motor 1252, and an opposing pinch roller 1254. The pinch roller, in a preferred embodiment, is linked to the capstan roller to keep them synchronized. For example, in an embodiment, rather than a freewheeling pinch roller, the pinch roller 1254 opposing the capstan roller also is powered by the capstan servo motor 1252. FIG. 13 illustrates such an embodiment, further described below. This arrangement increases the available friction surface area and reduces roller slippage to improve weighing accuracy.

In addition, the weigh station pinch roller 1254 may be mounted on an active swing arm assembly, as distinguished from a traditional spring-loaded swing arm. Here, the swing arm (or tension arm) is coupled to a tension arm servo controller 1260. The servo controller precisely controls force applied to the tension arm as further explained later. A passive spring system, by contrast, presents increased force (due to increased spring compression) on thicker mail pieces. One example of an active swing arm assembly is described below with regard to FIG. 13.

Two additional capstan and pinch roller assemblies provide speed normalization for mail pieces of varying length. A capstan 1266 and opposing pinch roller 1268 ensures that all mail pieces are presented to the measurement rollers in the weigh station at uniform velocity. Another capstan 1270 and opposing pinch roller 1272 restores each mail piece to the original transport speed. These capstans may be controlled by a speed controller 1274. These outboard pinch rollers may be controlled (opened and closed) by the scale system controller 1230.

The controller coordinates their actions, based on input from the photo detectors, to grip a mail piece in the weigh station assembly (1252, 1254), immediately after releasing it from the input side pinch roller assembly (1266, 1268) or at substantially the same time as the piece is released, so as to minimize slowdown. Preferably, the grip in the weigh station is fast and firm, so as to minimize slippage in the rollers. For example, the force applied may be on the order of two pounds force. In an embodiment, this gripping force is applied by the tension arm motor, under a precise servo control, and further described below. Slippage is also minimized by synchronized, active drive of the capstan roller and the pinch roller, rather than using a passive pinch roller. In another embodiment, a lesser gripping force may be applied. A system may be programmed to wait, for example on the order of 10 msec, to ensure that the piece has stopped slipping.

In one embodiment, the servo controller 1250 receives speed feedback from the capstan motor 1252, and drives the motor as programmed. For example, it may be arranged to accelerate or decelerate the mail piece by a predetermined amount. The servo loop must be fast and accurate enough to accelerate (and/or decelerate) a mail piece as commanded within a time frame that is practical for in-line applications. Suitable servo motors and amplifiers are described above. Preferably, weighing of one piece is done within approximately 40 msec. The motor torque profile acquired during that acceleration can be analyzed to determine weight of the mail piece. The acceleration produces a spike or impulse in motor torque that may be captured and analyzed to determine weight. By contrast, a constant velocity in this scale would not work.

In other embodiments, mentioned above, the servo system may not seek to accelerate or decelerate the piece to a new velocity. Rather, it may inject an impulse to maintain a zero weight state.

FIG. 13 is a side view of an embodiment of an in-line weighing apparatus, installed on a platform or deck 1300 made of a sturdy, rigid material such as steel. The deck may be, for example, on the order of 1.0 cm thick, but this dimension is not critical. The deck surface must be substantially flat and smooth so as to provide a surface for mail pieces to glide over it without significant friction. A first roller (intake roller) 1302 is part of a capstan (1402) and opposing pinch roller pair, better seen in FIG. 14 top view. This is an intake roller as a mail piece travels from left to right in the drawing, as indicated by the arrow 1400 in FIG. 14. A similar output roller 1304 is again part of a capstan (1404) and pinch roller pair as shown in FIG. 14 in top view.

In operation, the intake capstan 1402 operates (CCW) at the same speed as a belt-driven transport section, if the weighing apparatus is installed in a larger machine such as a sorter, to normalize the speed of a mail piece for pieces of different lengths. This enables all incoming pieces to enter the weighing assembly at the same speed. The actual or absolute value of that speed is not critical for present purposes. In contradistinction to prior art, this system does not rely on speed measurements. It is merely necessary that all articles are presented to the weighing servo at identical speed regardless of length.

Referring again to FIG. 13, a weighing assembly 1310 includes a Capstan Roller, driven by a Capstan Motor 1312, via a shaft 1318 (see FIG. 16) which passes through the deck 1300. All the rollers (1302, 1402, Capstan Roller, Pinch Roller 1316, 1304, and 1404 are located above the deck 1300 for conveying mail pieces (left to right) over the surface of the deck. The various motors, gears and belts, described below, preferably are located below the deck, leaving a clear path for the moving mail pieces. In another embodiment, some drive mechanics may be located above the deck.

Capstan Motor 1312 also indirectly drives an opposing Pinch Roller 1316 (see FIG. 14), so that the Capstan Roller and Pinch Roller are precisely synchronized. This minimizes roller slippage to improve weighing accuracy. Referring now to FIG. 15, the Capstan Motor 1312, shaft 1318, drives Belt1, which in turn is linked to the opposing Pinch Roller 1316 as follows. The Capstan Motor shaft 1318 (CCW) drives Belt1, which in turn drives a Gear1. Gear1 is mounted co-axially on a bearing on shaft 1332 of the tension arm motor 1330, so that Gear1 is free to rotate independently of the shaft 1332. An idler Gear2 is engaged with Gear1, so that rotation of Gear1 drives Gear2 clockwise, as indicated by arrows in the drawing. Force applied by the tension arm motor 1330 does not affect the operation of Gear1 or Gear 2. (The role of the tension arm motor is further described below.) See also the perspective view in FIG. 16. Gear2, driven by Gear1 as noted, in turn is arranged to drive a Belt2 in CW rotation as shown in FIG. 15. Belt2 in turn is arranged to rotate a pulley 1340, which is mounted to a shaft 1314 to drive the Pinch Roller 1316.

Note the presence of a rigid tension arm 1320. The tension arm is mounted at one end on shaft 1332 of the tension arm motor 1330. The tension arm 1320 supports the idler Gear2 which is mounted on a bearing for free rotation. The other end of the tension arm, opposite the tension arm motor, comprises a generally cylindrical housing 1320(*a*), although the exact shape is not critical. Housing 1320(*a*) has a shaft 1314 rotatably mounted therein, for example in a bearing assembly (not shown). The shaft 1314 extends upward through the deck 1300 to drive the Pinch Roller. The shaft is driven by Belt2 by means of a pulley 1340 mounted on the shaft 1314. FIG. 16 is a perspective view of the weighting assembly 1310, showing the deck in phantom for clarity. FIG. 17 is a perspective view of the tension arm 1320 standing alone. This design is merely an example and not intended to be limiting.

In operation, the tension arm motor 1330 rotates the tension arm through a limited range on the order of approximately +/−10 degrees from a neutral or center setting. The exact range of motion is not critical. This rotation serves to adjust the position of the pinch roller 1316, as it is mounted to the tension arm as mentioned. An oblong slot 1315 in the deck accommodates this motion (see FIG. 16). Because the Capstan Roller is fixed in position relative to the deck, repositioning the Pinch Roller has the effect of adjusting the pinching force between the Capstan Roller and the opposing Pinch Roller, to keep it constant.

The tension arm motor 1330 preferably is driven by a precision servo control system, so that it provides a selected constant force on the Pinch Roller. This feature is distinguished from other systems in which pinch rollers generally are urged against the capstan roller by a spring. Springs provide a tension or force that varies with distance (compression of the spring). A spring therefore would cause the tension in a mail system to vary with the thickness of each mailpiece, interfering with weighing operations as described herein. The system described above provides a constant force for gripping a mail piece in the weighing apparatus independent of the thickness of the mail piece (within reasonable bounds). Note that tension arm servo controller data can be used to record mail piece thickness if desired.

In one embodiment, a motion damper 1390 is fixed to the deck (see FIG. 15) and arranged to apply a damping force to the tension arm to suppress vibration of the tension arm when it closes on a mail piece at high speed. The damper shaft and piston are connected to the tension arm. A tension arm motion damper may be commercially available Ace Controls, model MA 225 or similar.

In a preferred embodiment, a capstan motor may be a commercially available servo motor such as Teknic model M-2311P or similar. The capstan motor may be controlled using, for example, a servo amplifier such as Teknic model SST-E545-RCX-4-1-3 or similar. In these amplifiers, also called servo drives, a high-speed DSP control processor controls all of the feedback loops: position, velocity and actual torque. Torque is actively measured and controlled, with losses in the motor effectively minimized. The operation is substantially all-digital: the motor measurements are converted directly into digital format for the DSP and the outputs to the motor are digital PWM pulse streams. In alternative solutions, analog processing may be used, as long as the performance characteristics described herein are met.

The tension arm motor may be a commercially available servo motor such as Glentek model GMBM-40100-13-0000000 or similar (Glentek, El Segundo, Calif.). This too is a brushless AC servo motor. It provides a 100 W power rating, 3000 rpm rated speed, and has a peak stall torque of about nine lb-inches. It may be controlled with a servo amplifier such as Glentek—SMA9807-003-001-1A-1 or similar. In operation, the servo amplifier can provide output data, in analog or digital form, that indicates torque applied to the motor as a function of time.

In one embodiment, mail pieces travel into and leave the scale at a speed on the order of 13 feet/second (156 inches per second). As noted, the exact transport speed is not critical. In a preferred embodiment, the system can calculate weight of each piece in real time. That leaves about 70 msec available for each measurement. Within that time, a system may capture, for example, 128 sample measurements from the capstan servo motor amplifier. Weighing accuracy should be within a range of approximately +/−7 grams (0.25 ounce). Prototypes have demonstrated accuracy on the order of +/−1 gram (0.035 ounce).

Active Tension Arm Damping

In some embodiments, the motion damper 1390 may succeed in damping unwanted vibration, but it also slows the opening and closing of the spacing or "gap" between the capstan roller and the opposed pinch roller (1316). This can adversely affect operation in very high-speed applications. Management of this gap is useful to higher speed weighing operations. For example, in some embodiments, the tension arm motion may take around 25 milliseconds to close on a mail piece. In some mail sorting systems, a 5-inch long mail piece represents a measurement interval of approximately 53 milliseconds, so just closing the gap to begin measurement takes up about half of the time available. Further, after measurement, the tension arm motion takes additional time to open the gap for removing the item. The timing of the operation is further complicated because of mail pieces (or other objects being weighed) that vary in length from one piece to another.

One way to alleviate this problem is to reduce the mass of the tension arm (1320). This may be done by modifying its design configuration, and or changing the material to a lighter material that still provides the necessary strength, stiffness, etc. For example, some plastics or carbon fiber composites may be suitable. A lighter tension arm could be repositioned more quickly (other factors being roughly equal).

The mechanical damping described above is functional but it introduces problems with gap management in some embodiments. The damper suppresses unwanted vibration during measurements, but it also retards opening the gap when a measurement is complete. Moreover, when a piece of varying thickness is processed, weight may be miscalculated, again because the damping interferes with the tension arm servo loop operation. Since the damper resists opening the gap (rotating the tension arm), if a piece gets thicker say, half way through its measurement, the capstan servo must apply torque to open it. And yet, this extra torque has nothing to do with the weight of the piece. This problem may be called the "credit card syndrome," alluding to mail pieces that contain credit cards.

An alternative embodiment employs active electronic damping, instead of using a mechanical damper as described above. In this embodiment, the damping function is controllable, and may be varied or switched on and off, depending on the state of the weigh operation. The damping is ON during weighing, i.e., when the tension arm is commanded to close. When the tension arm closes to grip an article, various tolerances and elasticity in the system will lead to some "bounce" which is to say a reversal in direction of the velocity of the tension arm. Moreover, repeated "bouncing" results in oscillation, all of which increase the time necessary for the weighing apparatus to "settle" before accurate measurement data can be acquired. By damping the system, when closing the tension arm, the settling time can be reduced, and thus the throughput or speed of the weighing system increased. Ideally, we seek to critically dampen a tension arm servo system in order to minimize the settling time.

Conversely, damping is turned OFF during reset, i.e., when retracting the tension arm to open the gap. Accordingly, the gap will open faster. "Bounce" or oscillation when the gap is opened is not harmful. In some embodiments, desired damping can be accomplished by changing the mode of the tension arm servo and applying appropriate "PID" (proportional, integral, differential) settings for the tension arm servo feedback loop. These are filter parameters of the well known digital PID-type servo filter. The specific values (gain factors) are readily determined by deriving coefficients for the equations of motion, but those values will vary with each particular system, and should be optimized for a given design.

The active damping described herein may be implemented in various ways, including digital, analog, or mixed digital and analog solutions. Implementations may incorporate software executable on a suitable processor, or they may use hardware in the sense of dedicated electronic circuits.

Figure 19:
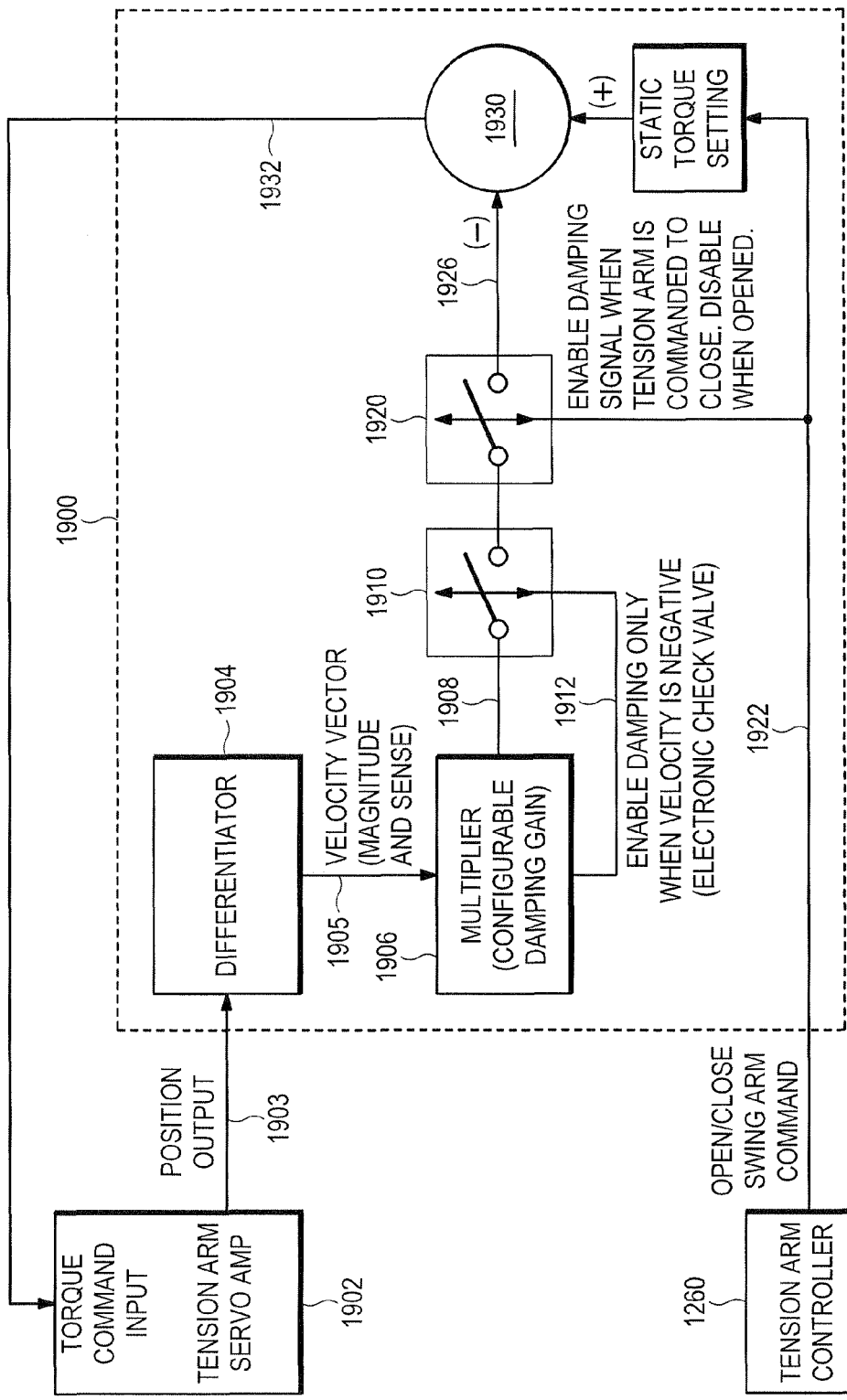
FIG. 19 is a simplified electronic system diagram of an example of an implementation of active, electronic damping for a tension arm servo system in an in-line scale.

FIG. 19 is a functional illustration of one embodiment. The dashed box 1900 represents an active electronic damping subsystem. A tension arm servo amplifier 1902 (discussed above) provides a position output signal indicative of a present position of the tension arm (1320 in FIG. 13, for example). Because the capstan roller is fixed in position, the tension arm position signal is indicative of the relative spacing or gap between the capstan roller and the pinch roller. This position signal again may be digital or analog, depending on the implementation. For this example, we proceed assuming an analog value (represented by a continuously variable voltage level). A position signal 1903 is input to a suitable differentiator 1904, which in turn produces a velocity vector 1905 (a quantity having a magnitude and sense or polarity). We arbitrarily define a positive velocity as corresponding to moving the tension arm in the direction of closing the gap (between the capstan roller and opposed pinch roller). A positive torque command (at 1932) input to the servo amp 1902 results in positive velocity of the arm.

The velocity vector is input to a multiplier 1906. The multiplier 1906 multiplies the velocity vector by a configurable damping gain factor. Preferably, the gain is selected (by calculation or empirically) to substantially critically damp the arm motion. When the arm "bounces" immediately after closing, the position signal change will result in a negative velocity vector (in the direction of opening the gap), and the multiplier 1906 will multiply or amplify that negative value, generating a damping signal 1908. The signal 1908 is input to a switch 1910. Switch 1910 is controlled by control signal 1912, provided by the multiplier 1906, that reflects whether the velocity is positive or negative. If the velocity is negative (reflecting a "bounce" motion of the arm), the control signal 1912 controls the switch 1910 to connect the damping signal to a second switch 1920. If the velocity is positive (gap is closing), switch 1920 remains open. The damping force in other words is inverted and scaled by the velocity generally in accordance with the following equation:

$$F_d = -cv = -c\frac{dx}{dt} = -c\dot{x}.$$

The tension arm controller 1260 generates an open/close binary swing arm command as discussed above, labeled as signal 1922. (The terms "tension arm" and "swing arm" are used interchangeably.) Command signal 1922 controls the second switch 1920. If the command is to open the gap, the command signal drives switch 1920 to an open position, so that the damping signal 1908, even if it reflects a negative velocity, is not coupled to the summing junction 1930. Alternatively, when the command signal 1922 is to CLOSE the gap, then switch 1920 is closed to couple the damping signal 1908 to the summing junction 1930. In this way, damping is enabled only when the tension arm is commanded to close. Conversely, no damping is applied when the command is to OPEN the gap, so the gap opens as quickly as possible. In the case of a mechanical motion damper, it cannot distinguish whether opening or closing is commanded or occurring, and thus it slows all operations, retarding performance.

Referring again to FIG. 19, the tension arm command signal 1922 is input to a static torque setting circuit for selecting a pre-configured torque command setting, responsive to the OPEN or CLOSE command. A CLOSE arm command as noted selects a positive torque setting. In that case, damping is enabled and switch 1920 is closed. Consequently, when the arm bounces, and a negative velocity vector appears, the gain-multiplied damping signal 1908 is connected via switch 1910 to switch 1920, and thence to the summing junction 1930. Note the inverting input (−) indicates that the damping signal is subtracted from the selected static torque setting. Since the velocity vector is negative, this damping signal adds to the torque setting, so as to oppose or dampen the bounce. Illustrative signal graphs are described below with regard to FIG. 20A.

Figure 8A:
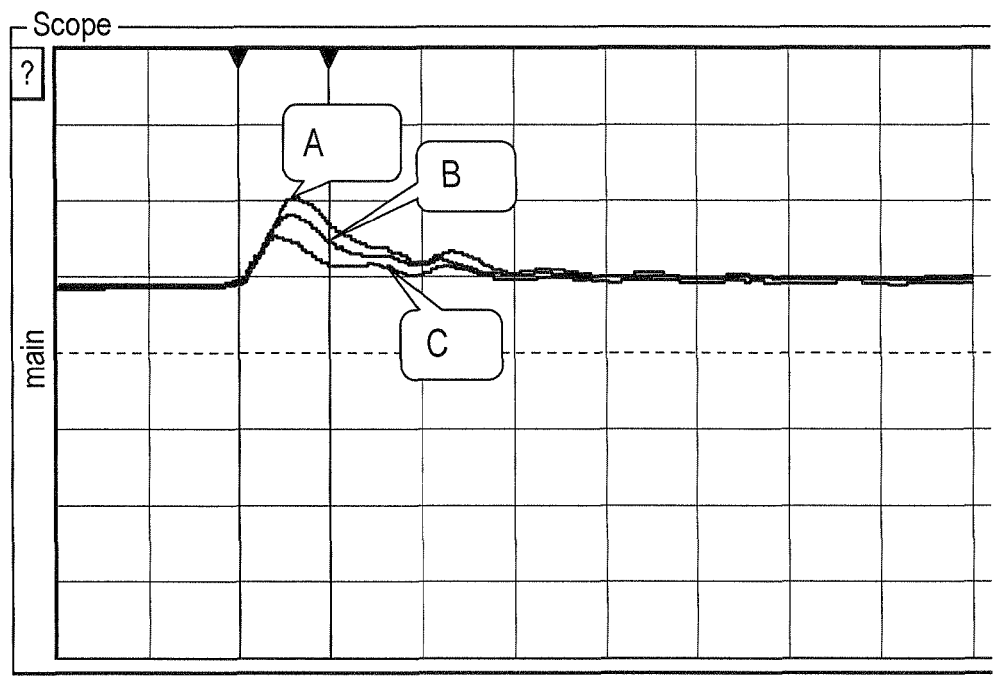
FIGS. 8A and 8B are oscilloscope traces of servo motor torque measurements taken in a development prototype weighing system in accordance with one aspect of the present invention.
Figure 8B:
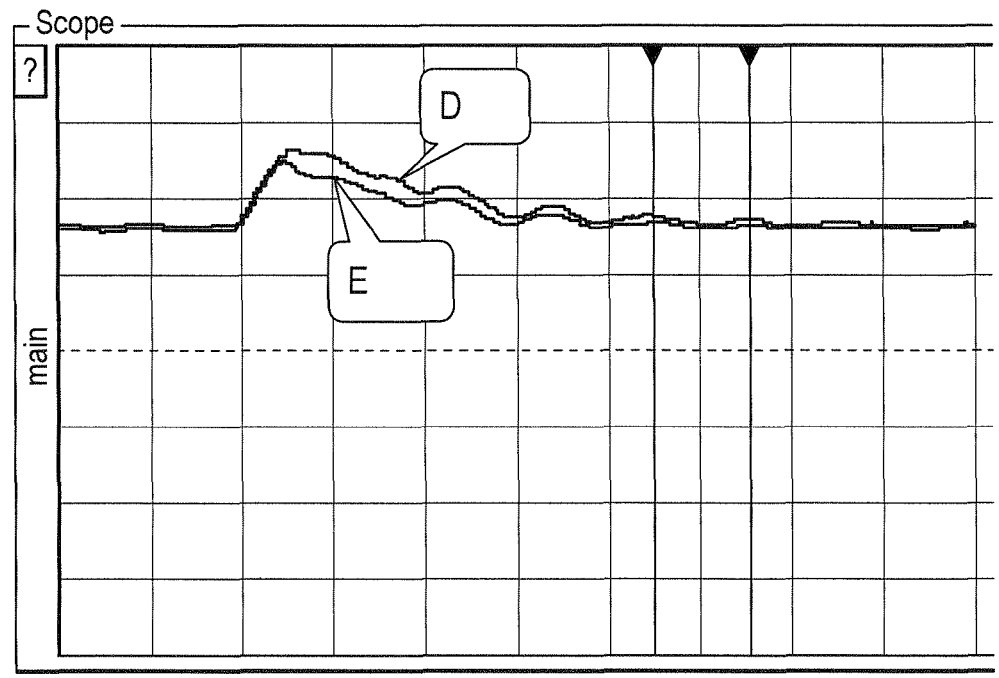

FIGS. 8A and 8B are oscilloscope traces of capstan servo motor torque measurements taken in a development prototype weighing system that implements aspects of the present invention. This data may be analyzed in various ways, for example using one or more suitably programmed digital processors. Preferably, a real-time system determines a weight of a mail piece from the corresponding servo amplifier data quickly enough that pieces can continue to move through the in-line scale at normal sorting system speeds. For example, 128 servo samples over 30 msec would require a data rate of around 4 k samples/sec.

FIG. 8A depicts a 5 gram differential torque measurement from a weigh on the fly prototype. Trace "C" is 12 grams, "B" is 17 g and "A" is 22 g. Vertical scale is ounce-inches of servo motor torque and horizontal is time (on the order of 10 msec per division). The first vertical cursor on the left is the point at which the mail piece trips the photo eye for the center roller (weighing) system. The other cursors are not relevant. It is straightforward to calibrate the system by weighing mail pieces of known weights.

FIG. 8B shows traces of 2.5 gram differential. The "E" line is 14.5 g and trace "D" is 17 g. These waveforms are of slightly different shape from the previous image due to increased oscilloscope gain and different mechanical settings on the test bed transport. These traces show clear resolution even down to 2.5 grams. We believe this can be extended to considerably finer resolution while continuing to process at full speed (e.g. 40,000 pieces per hour).

In an embodiment, it is helpful to conduct a Fourier analysis on the torque waveform sample data. The discrete Fourier transform (DFT) may be used to reduce the data to a small number of values or coefficients. The DFT can be computed efficiently in practice using a fast Fourier transform (FFT) algorithm. By pre-computing the same analysis on known calibration pieces, the Fourier coefficients of interest may be stored, for example in a lookup table, to determine weights later during operation by comparison to the values in the table. This approach provides an effective way to compare the torque waveforms to provide accurate measurements. It also helps to filter out vibration and other system noise from the measurement data.

In one embodiment, an in-line scale system of the type described above may be deployed within or in tandem with automated mail handling equipment such as a destination bar code sorter machine (DBCS). On the bar code sorter system in this example, the transport belt speed is 153 ips. The capstan servo on the ILS runs at 250 ips tangential velocity. The shortest mail piece is 5 inches long, plus a 3.5 inch minimum gap between pieces. So at an incident speed of 153 ips, we have a measurement interval of approx 56 ms between pieces. This timing is illustrated in the upper trace of FIG. 18. The system therefore needs to complete all sampling and processing in this interval to operate in "real time".

Figure 18:
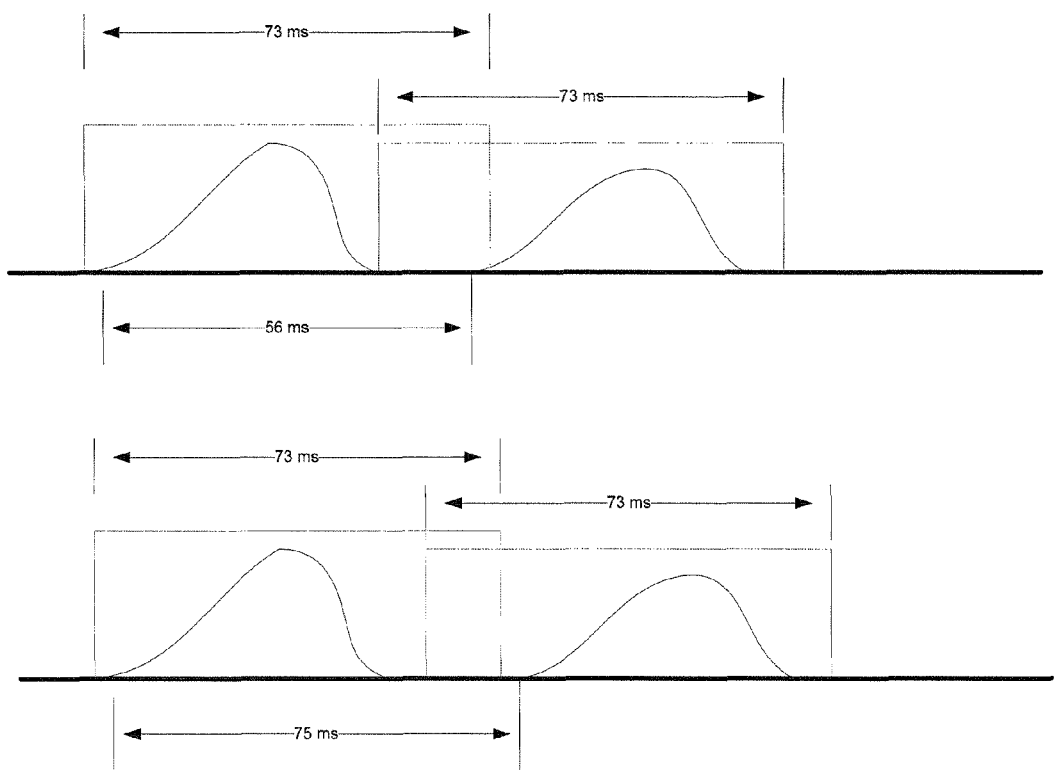
FIG. 18 shows sample measurement waveforms to illustrate an example of weighing "on the fly" at a typical bar code sorter system transport belt speed.

In a preferred embodiment, the system acquires 128 samples to the FFT, and the servo system described above samples at 1750 samples per second. This means that the sampling interval per piece is approx 73 ms. However, as noted, in the present example, only about 56 msec is available between pieces. One solution to this apparent dilemma is to simultaneously sample into 2 separate measurements that are offset in time. The system thus is multi-threaded. We center the torque impulse data for each piece in the 73 msec window so any data that appears in sequential measurements is where the servo is quiescent or between pieces. This is essentially the zero area. This overlap technique is illustrated in FIG. 18. In the top figure, the time between the leading edge of the impulses is 56 ms because the pieces are 5 inches long separated by 3.5 inches. In the bottom figure, the pieces are 8 inches long so the sampling overlap is smaller. The gap is constant at about 3.5 inches.

Adapting for Thickness Variations

Variations in the thickness of an object being weighed, mentioned above as the "credit card syndrome," can lead to measurement errors or reduced accuracy in some situations. As discussed above, in a system with active tension arm damping, once the tension arm closes on an object, the damper treats any movement away from the closed position as a bounce and acts to suppress it. The effect is that the capstan servo is required to supply the torque needed to counteract the damping force, and the capstan servo system reads this additional torque as force required to accelerate mass, resulting in inaccurate weighing measurement.

Figure 20A:
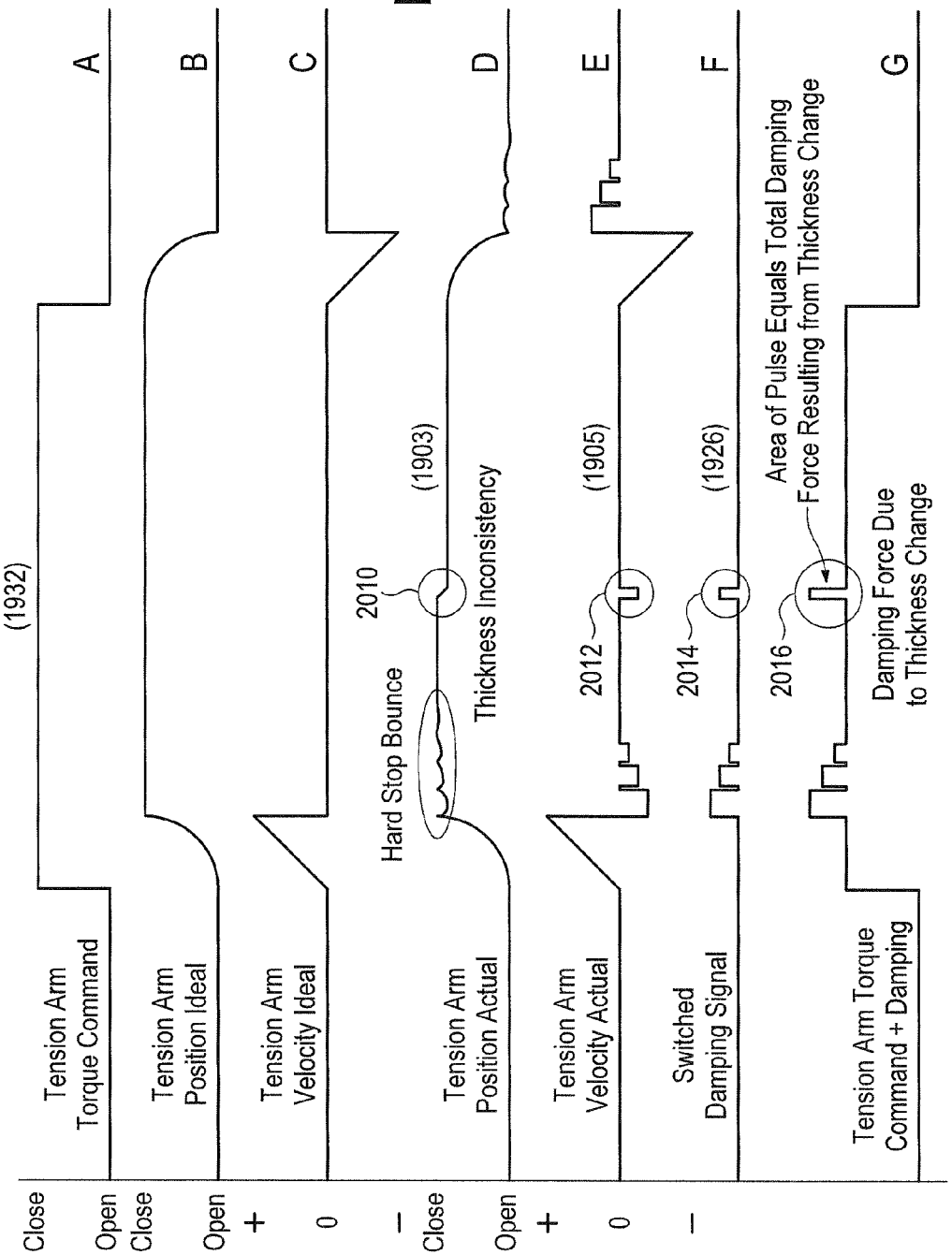
FIGS. 20A-20B present a series of signal graphs to illustrate operation of one embodiment of a weighing system in accordance with the present disclosure.
Figure 20B:
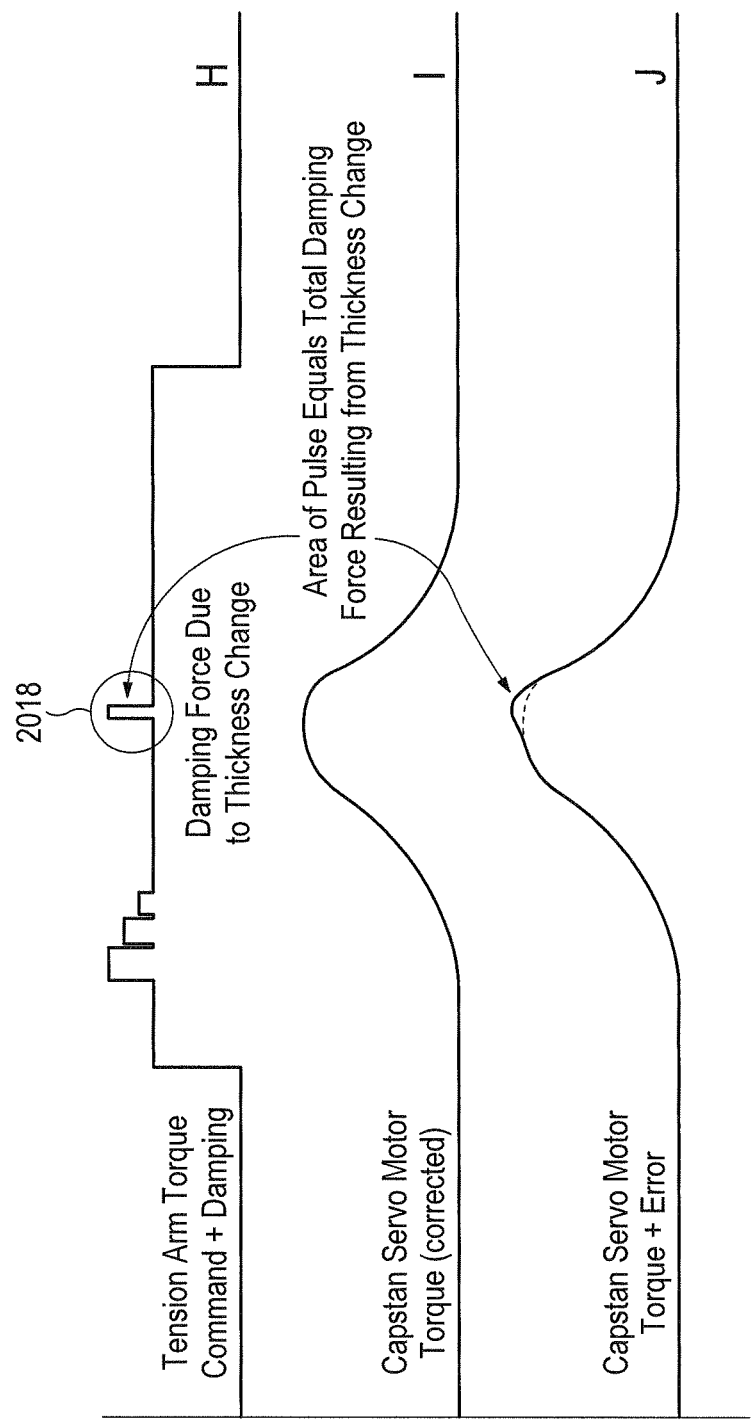

This problem is illustrated in a series of signal graphs in FIGS. 20A-20B. In the figures, the various signals are labeled from "A" through "J" for identification, and they are aligned temporally. (The drawings are merely illustrative; they are not exact or to scale.) Signal A represents tension arm torque command (see 1932 in FIG. 19). It changes state from OPEN command to CLOSE command at the appropriate time to begin a measurement cycle. Signal B represents the tension arm position ideal; it moves to the closed position and remains in that position until the measurement is completed and the torque command changes to OPEN. Signal C represents the tension arm velocity ideal (derivative of the ideal position). Signal D illustrates the tension arm actual position, indicating how it bounces when the arm closes on the object (labeled "Hard Stop Bounce") in the absence of active damping. (Signal D generally corresponds to a position output signal 1903 in the illustration of FIG. 19.)

The signal graph D also illustrates at 2010 a thickness inconsistency in the object being weighed, which results in a change in the tension arm position. In this case, the arm opens as a thicker portion moves between the pinch roller and the capstan roller (See FIG. 14). This thickness change results in corresponding pulses 2012, 2014, 2016 on signals E, F and G, respectively, as illustrated in FIG. 20A. In signal G, the pulse 2016 represents the damping force due to the thickness change. More specifically, the area of pulse 2016 equals (or is proportional to) the total damping force resulting from the thickness change.

Turning now to FIG. 20B, signal waveform H is essentially a duplicate of signal G from FIG. 20A for reference. Signal J illustrates the capstan servo motor torque including the error caused by the thickness change. Signal I shows the corrected capstan servo motor torque, determined by subtracting the total force absorbed by the damping action (corresponding to the area of pulse 2018 on trace H) from the total force applied by the capstan. These calculations may be done, in one embodiment, in the ILS Processor 1212 of FIG. 12. The resulting measurement data effectively ignores the inconsistency in thickness of the object. While only a single change in thickness has been discussed for illustration, the systems and methods described herein would react to additional changes, be they increases or decreases in thickness, in similar fashion as such inconsistencies may be encountered.

Hardware and Software

Several examples have been described above with reference to the accompanying drawings. Various other examples of the invention are also possible and practical. The system may be exemplified in many different forms and should not be construed as being limited to the examples set forth above. The system described above can use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, aspects of the invention may be implemented in a digital computing system, for example a CPU or similar processor in a sorter system, in-line scale (standalone), or other embodiments. More specifically, by the term "digital computing system," we mean any system that includes at least one digital processor and associated memory, wherein the digital processor can execute instructions or "code" stored in that memory. (The memory may store data as well.)

A digital processor includes but is not limited to a microprocessor, multi-core processor, DSP (digital signal processor), GPU, processor array, network processor, etc. A digital processor (or many of them) may be embedded into an integrated circuit. In other arrangements, one or more processors may be deployed on a circuit board (motherboard, daughter board, rack blade, etc.). Aspects of the present invention may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example RAM or FLASH memory embedded in an integrated circuit CPU, network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, aspects of the present invention may be implemented or embodied in computer software (also known as a "computer program" or "code"; we use these terms interchangeably). Programs, or code, are most useful when stored in a digital memory that can be read by one or more digital processors. We use the term "computer-readable storage medium" (or alternatively, "machine-readable storage medium") to include all of the foregoing types of memory, as well as new technologies that may arise in the future, as long as they are capable of storing digital information in the nature of a computer program or other data, at least temporarily, in such a manner that the stored information can be "read" by an appropriate digital processor. By the term "computer-readable" we do not intend to limit the phrase to the historical usage of "computer" to imply a complete mainframe, minicomputer, desktop or even laptop computer. Rather, we use the term to mean that the storage medium is readable by a digital processor or any digital computing system as broadly defined above. Such media may be any available media that is locally and/or remotely accessible by a computer or processor, and it includes both volatile and non-volatile media, removable and non-removable media, embedded or discrete.

It will be obvious to those having skill in the art that many changes may be made to the details of the above-described embodiments without departing from the underlying principles of the invention. The scope of the present invention should, therefore, be determined only by the following claims.

The invention claimed is:

1. A weighing assembly for an in-line scale comprising:
   (a) a capstan roller;
   (b) a capstan motor operative coupled to drive the capstan roller;
   (c) a pinch roller, positioned opposite the capstan roller and linked to the capstan motor for rotation in synchrony with the capstan roller;
   (d) a first servo amplifier electronically coupled to the capstan motor and arranged to drive the capstan motor to a selected command speed of rotation, and to acquire torque data from the capstan motor while a moving article is gripped between the capstan roller and the pinch roller; the torque data responsive to accelerating or decelerating the moving article toward the command speed;
   (e) a tension arm arranged for supporting the pinch roller while allowing free rotation of the pinch roller responsive to the capstan motor, and to enable repositioning the pinch roller;
   (f) a tension arm motor operatively coupled to the tension arm, wherein the tension arm is arranged to translate torque applied to it by the tension arm motor to reposition the pinch roller relative to the capstan roller, thereby providing a controllable gripping force for gripping the moving article between the pinch roller and the capstan roller;
   (g) a second servo amplifier electronically coupled to the tension arm motor and arranged to drive the tension arm motor responsive to a torque command input to apply a controllable force to the pinch roller while an article is gripped between the capstan roller and the pinch roller; wherein the second servo amplifier provides a position output signal indicative of a current position of the pinch roller as the article moves between the pinch roller and capstan roller;
   (h) an active electronic motion damper coupled to the second servo amplifier to modify the torque command input by a damping force responsive to a change in the position output signal so as to suppress oscillation of the tension arm when encountering a change in thickness of the article; and
   (i) a processor configured for processing the torque data acquired by the first servo amplifier to determine a weight of the article;
   (j) wherein the processor is further configured to correct the acquired torque data by subtracting the damping force from the acquired torque data.

2. The weighing assembly of claim 1 wherein the active electronic motion damper is configured to dampen motion of the tension arm only when gripping an article between the pinch roller and the capstan roller.

3. The weighing assembly of claim 1 wherein the active electronic motion damper is implemented in a digital filter.

4. The weighing assembly of claim 1 wherein the active electronic motion damper is configured to enable damping motion of the tension arm only when a velocity vector responsive to the position output signal indicates that velocity of the tension arm is negative.

5. The weighing assembly of claim 1 and wherein the processor is arranged to determine the weight of the article by comparing the corrected torque data to previously stored calibration data.

6. The weighing assembly of claim 1 and wherein the processor is arranged to determine the weight of the article by applying a Fourier analysis of the corrected torque data and comparing the results of the Fourier analysis to previously stored Fourier calibration data.

7. The weighing assembly of claim 1 and wherein the processor is coupled to the first servo amplifier is configured to acquire two streams of capstan motor torque sample data from the first servo amplifier, the sample streams overlapping but offset in time.

8. An in-line scale comprising:
(a) a first servo loop means for driving a capstan servo motor;
(b) a capstan roller operative coupled to the capstan motor;
(c) a pinch roller linked to the capstan motor for rotation in synchrony with the capstan roller and arranged adjacent to the capstan roller for gripping a moving object received between the pinch roller and the capstan roller with minimal slippage;
(d) a second servo loop means for driving a second servo motor, the second servo motor coupled to the pinch roller for controllably repositioning the pinch roller relative to the capstan roller so as to provide a gripping force for controllably gripping a moving object between the pinch roller and the capstan roller;
(e) a rigid tension arm coupled to the tension arm motor and supporting the pinch roller so as to allow free rotation of the pinch roller responsive to the capstan motor, the tension arm arranged for translating rotational force of the tension arm motor into forcing the pinch roller toward the capstan roller to provide said gripping force;
(f) an active electronic motion damping means coupled to the second servo motor to suppress vibration of the pinch roller when it closes on an article to grip the article between the pinch roller and the capstan roller; and
(g) electronic weighing means coupled to the first servo loop means for determining a weight of a moving object gripped between the pinch roller and the capstan roller responsive to a torque applied to the capstan motor; and wherein:
(h) the electronic weighing means is also coupled to the second servo loop means for detecting a change in thickness of a moving article gripped between the pinch roller and the capstan roller; and
(i) the electronic weighing means is arranged to adjust the capstan motor torque measurement by subtracting an amount of torque attributable to the active electronic motion damping means responding to the change in thickness of the moving article.

9. The in-line scale of claim 8 and wherein the active electronic motion damper means includes:
input means to receive a position signal;
differentiator means for differentiating the position signal to generate a velocity vector;
a configurable multiplier means for multiplying the velocity vector to generate a damping signal;
a command input to receive an open/close command signal;
a static torque setting means for selecting a static torque setting responsive to the command signal; and
summing means arranged for summing the damping signal and the selected static torque setting to form a torque command input signal to the second servo loop means for damping bounce or vibration of the pinch roller only when the velocity vector indicates bounce or vibration, and the command signal indicates close.

10. The in-line scale of claim 9 wherein the summing means comprises:
a first switch arranged to receive the damping signal;
a second switch arranged to receive an output from the first switch;
a summing circuit arranged to receive an output from the second switch and to sum the output from the second switch with a selected static torque setting; and wherein
the first switch is controlled by a sense of the velocity vector to enable damping only when the sense of the velocity vector indicates that the pinch roller is moving toward the capstan roller; and
the second switch is controlled by the command input to enable damping only when the command signal indicates close.

11. The in-line scale of claim 8 wherein the electronic weighing means detects the change in thickness of the article by detecting a change in the tension arm position signal or a change in the tension arm velocity vector.

12. The in-line scale of claim 8 wherein the electronic weighing means is arranged to determine the torque attributable to the active electronic motion damping means responding to the change in thickness of the moving article based on a tension arm torque command input signal provided by the active electronic motion damping means.

* * * * *